US007130356B2

(12) United States Patent
Kaku et al.

(10) Patent No.: US 7,130,356 B2
(45) Date of Patent: Oct. 31, 2006

(54) DATA TRANSMISSION METHOD AND DATA TRANSMISSION APPARATUS

(75) Inventors: Takashi Kaku, Kawasaki (JP); Kyoko Hirao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1031 days.

(21) Appl. No.: 10/047,131

(22) Filed: Jan. 15, 2002

(65) Prior Publication Data

US 2003/0007190 A1    Jan. 9, 2003

(30) Foreign Application Priority Data

Jun. 20, 2001   (JP) .............................. 2001-186274

(51) Int. Cl.
*H04L 27/04* (2006.01)
(52) U.S. Cl. ..................................... 375/295
(58) Field of Classification Search ................ 375/135, 375/146, 240.18, 240.19, 267, 295, 222, 375/260; 370/205; 714/700, 701, 774, 788
See application file for complete search history.

(56) References Cited

U.S. PATENT DOCUMENTS

| 5,610,908 | A  | * | 3/1997  | Shelswell et al. ........... 370/210 |
| 6,546,249 | B1 | * | 4/2003  | Imai et al. ................... 455/436 |
| 6,563,865 | B1 | * | 5/2003  | Usui ........................... 375/222 |
| 6,952,394 | B1 | * | 10/2005 | Kim et al. .................... 370/208 |

2002/0159425 A1 * 10/2002 Uesugi et al. .............. 370/342

OTHER PUBLICATIONS

Goeckel et al. Increasing Diveristy with Non-Standard Signal Sets in Wireless OFDM Systems, 1999 IEEE, p. 20-24.*
Jean Armstrong. "New OFDM Peak-to Average Power Reduction Scheme" Institute of Electrical and Electronic Engineers, IEEE Vehicular Technology Conference vol. 1 of 4, Conference 53, May 6, 2001, pp. 756-760, XP001067602.
Khaled Fazel. "Performance of CDMA/OFDM for Mobile Communication System" Universal Personal Communications, vol. 2, Oct. 12, 1993, pp. 975-979, XP010198262.
Hanna Bogucka. "Effective Implementation of the OFDM/CDMA Base Station Transmitter Using Joint FHT and IFFT" Signal Processing Advances in Wireless Communications, May 9, 1999, pp. 162-165, XP010345739.
Donald Fraser. "Interpolation by the FFT Revisited-An Experimental Investigation" IEEE Transactions On Acoustics, Speech and Signal Processing, vol. 37, No. 5, May 1989, pp. 665-675, XP002371172.

* cited by examiner

*Primary Examiner*—Khanh Tran
*Assistant Examiner*—Sam K. Ahn
(74) *Attorney, Agent, or Firm*—Katten Muchin Rosenman LLP

(57) ABSTRACT

A data transmission method includes the steps of: a) performing two-dimensional interleaving along a time axis and along a frequency axis; b) transmitting thus-obtained data by a multi-carrier transmission form; and c) producing, by channel copy operation, data which is short with respect to the required number of channels for fast inverse Fourier transform performed antecedent and subsequent to the step a).

9 Claims, 22 Drawing Sheets

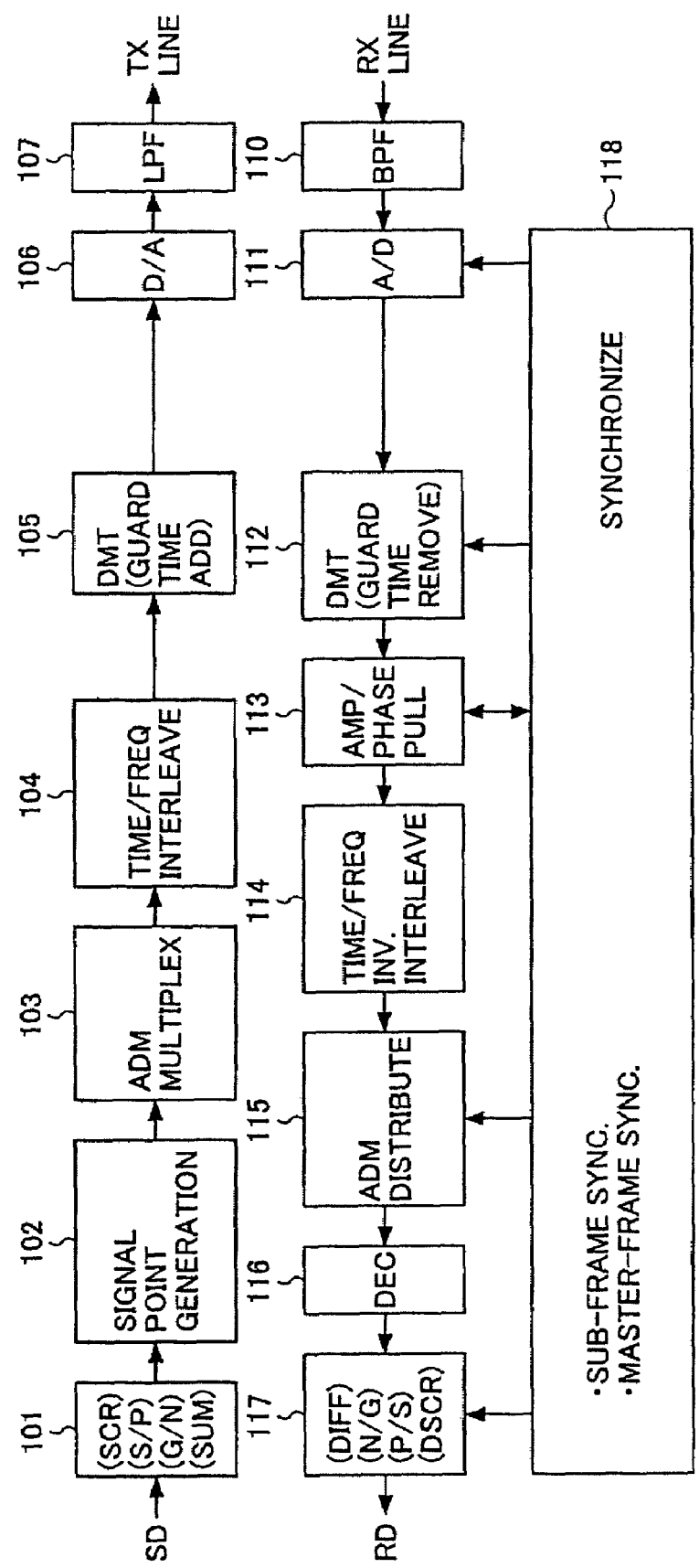

PRIOR ART
(1) SAMPLED VALUES AND SPECTRUM OF S(n)
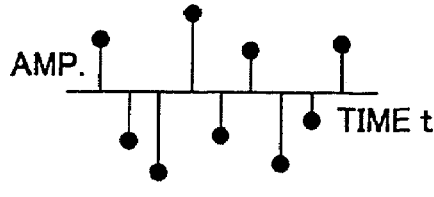 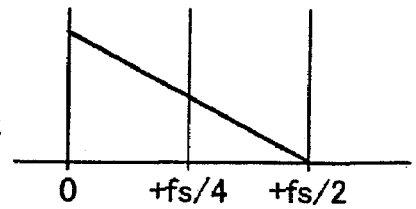
(2) SAMPLED VALUES AND SPECTRUM OF $(-1)^n * S(n)$
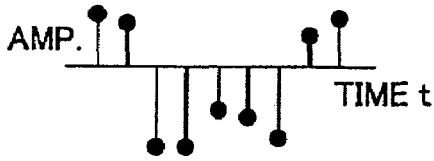 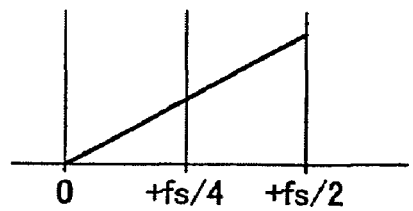
FIG.7
(3) SAMPLED VALUES AND SPECTRUM OF t(n)
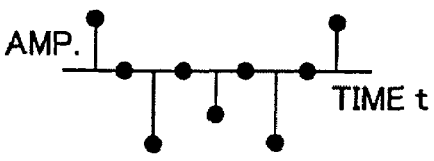 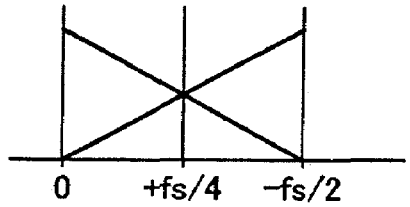
(4) SAMPLED VALUES AND SPECTRUM OF u(n)
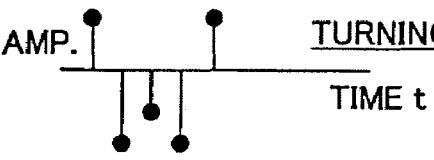 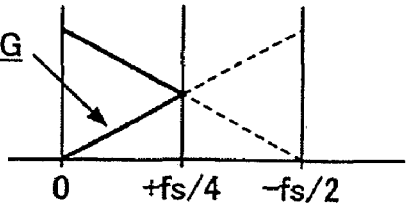

PRIOR ART
FIG. 8
(1) SAMPLED VALUES AND SPECTRUM OF u(n)
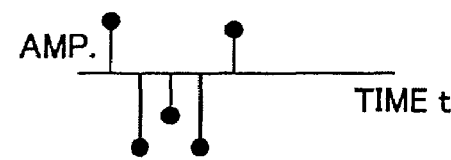
(2) SAMPLED VALUES AND SPECTRUM OF t(n)
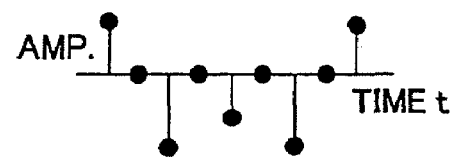
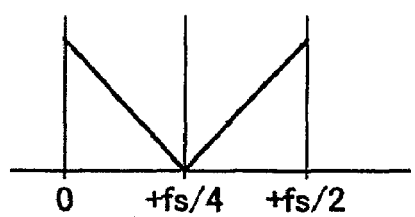

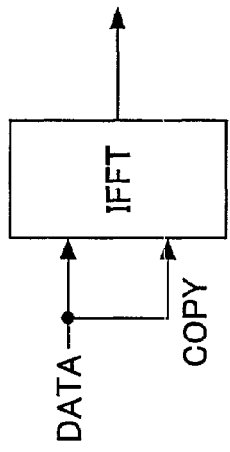
FIG.14A
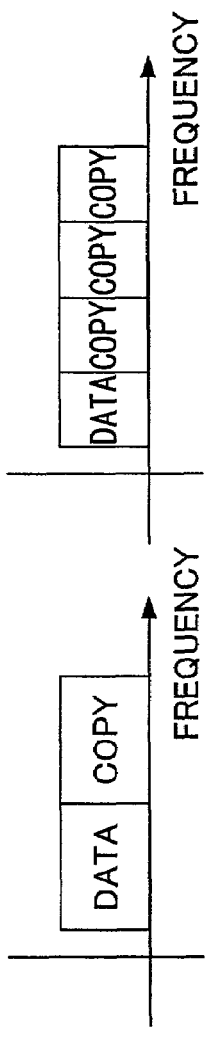
FIG.14B
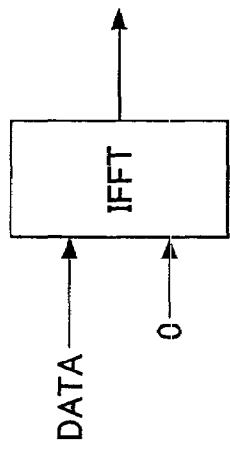
FIG.14C
(ZERO INSERTION)
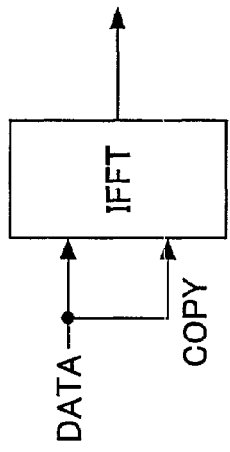
FIG.14D
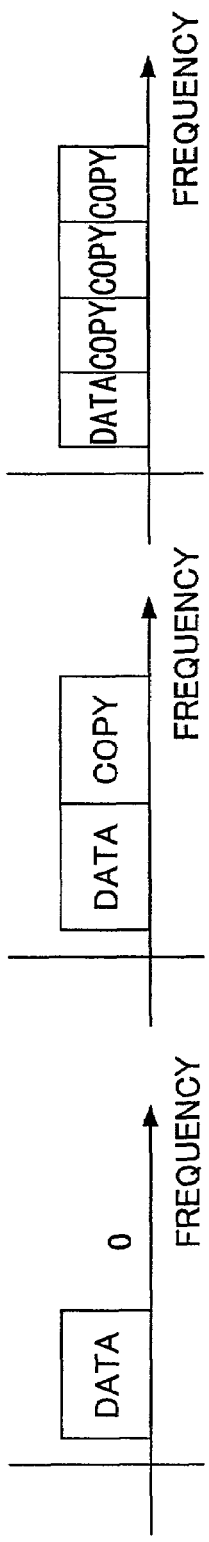
FIG.14E
FIG.14G
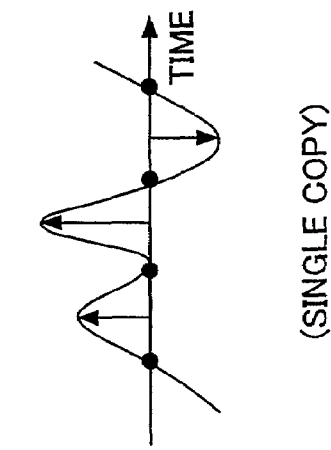
FIG.14F
(SINGLE COPY)
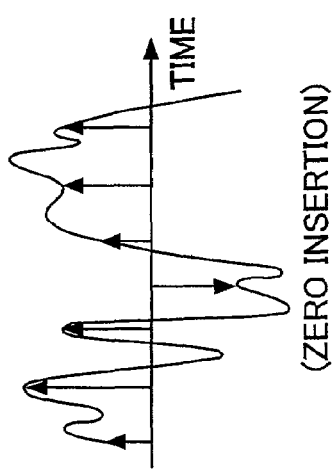
FIG.14H
(THRICE COPY)
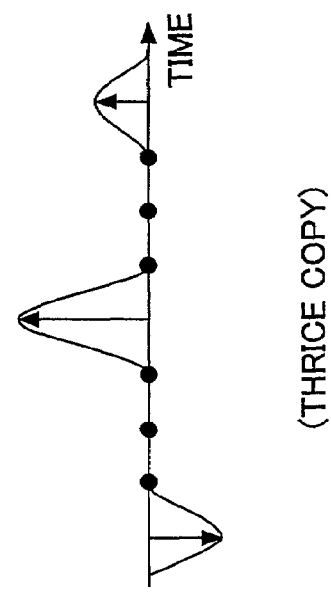

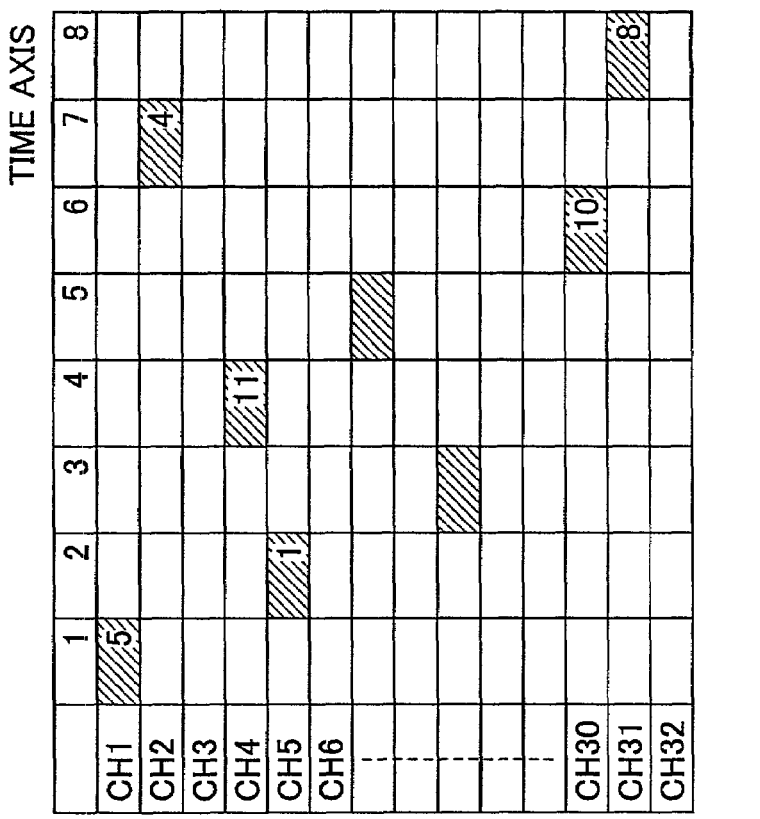
FIG.15A (DATA STOCK)
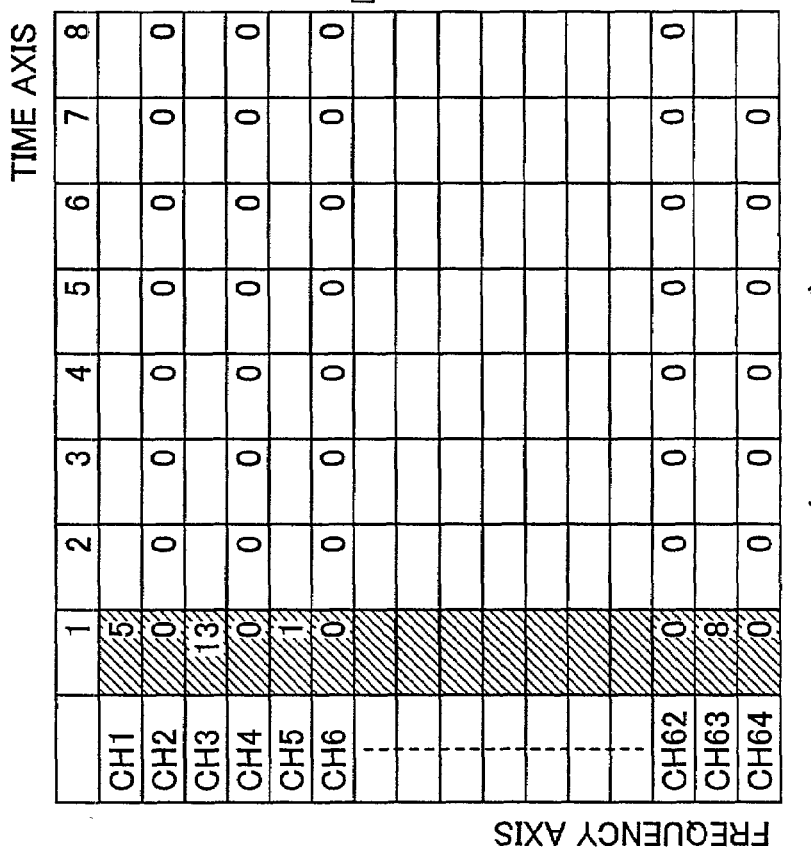
FIG.15B (TWO-DIMENSIONAL INTERLEAVING)

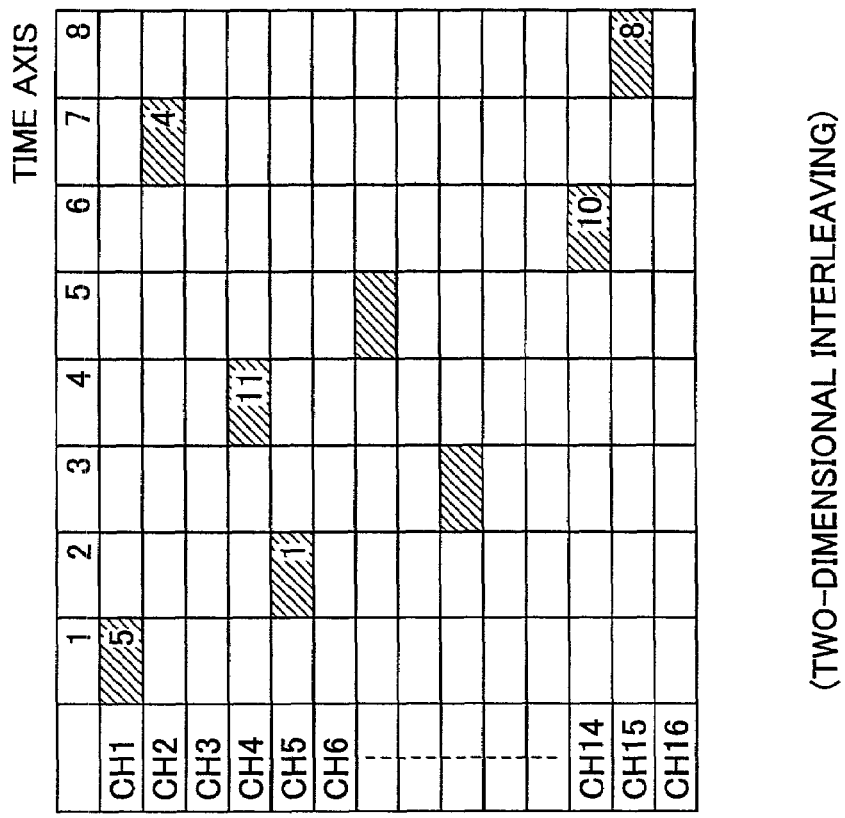
FIG.16B (TWO-DIMENSIONAL INTERLEAVING)
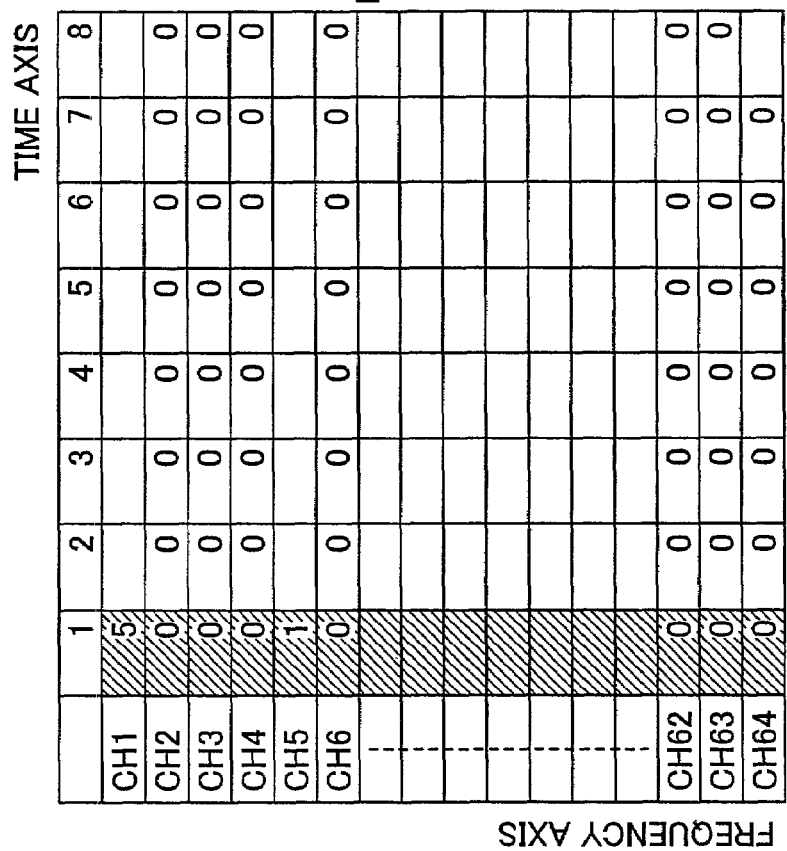
FIG.16A (DATA STOCK)

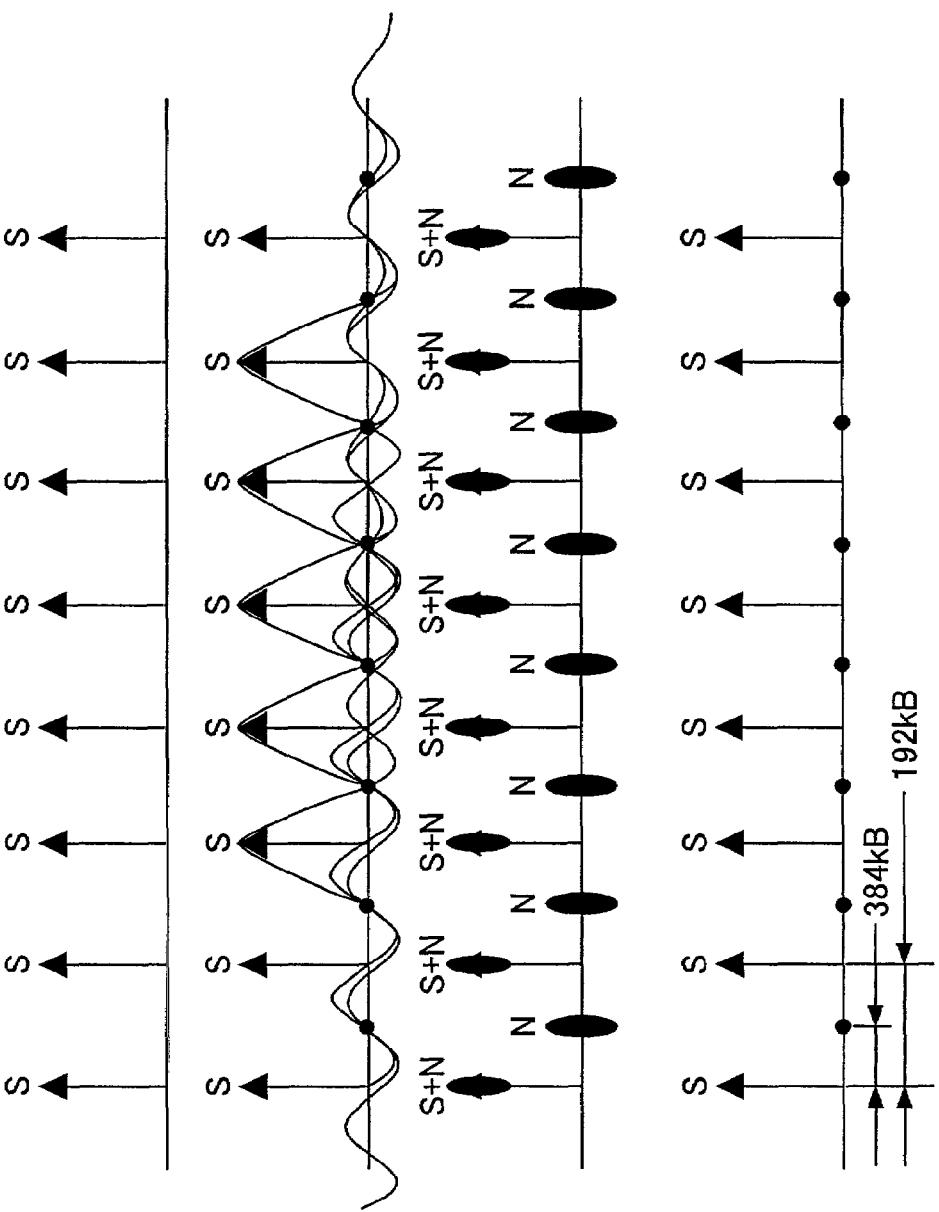

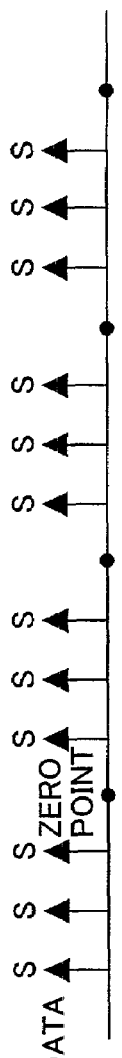
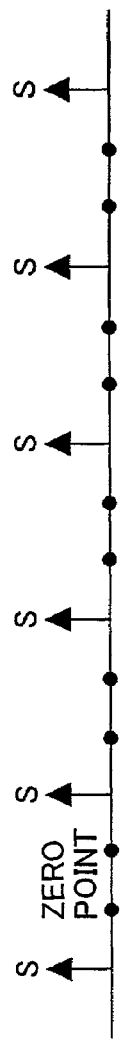
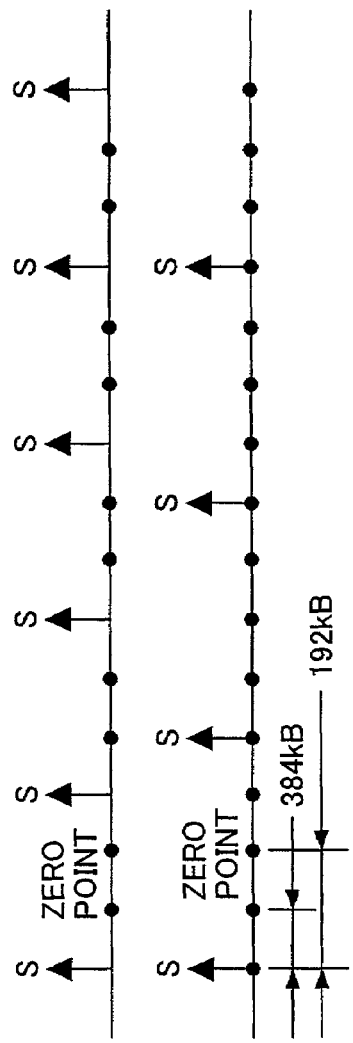
FIG.18A COPY OF TOP 16 SETS OF DATA (ORIGINAL BAND: 288kHz)
FIG.18B COPY ONCE (ORIGINAL BAND: 192kHz)
FIG.18C COPY TWICE (ORIGINAL BAND: 128kHz)
FIG.18D COPY THRICE (ORIGINAL BAND: 96kHz)

FIG.22

| PROBLEM | MODULATION FORM/TYPE | | | | INVENTION | SCHEME |
|---|---|---|---|---|---|---|
| | QAM | DMT | OFDM | SS | | |
| LINK EQUATION | ▲ | ○ | ○ | ▲ | ○ | EMPLOY DMT |
| MULTIPATH | ▲ | ○ | ○ | ○ | ○ | EMPLOY DMT |
| USELESS BAND REMOVAL | ○ | ▲ | ▲ | ▲ | ○ | EMPLOY QAM CHANNEL |
| NOISE FLUCTUATION | ○ | ▲ | ▲ | ○ | ○ | EMPLOY TIME-AND-FREQUENCY INTEGRATION |

DATA TRANSMISSION METHOD AND DATA TRANSMISSION APPARATUS

BACKGROUND OF THE INVENTION

1. Field of the Invention

The present invention relates to a data transmission method and a data transmission apparatus performing two-dimensional interleaving operation along a frequency axis and along a time axis on transmission data, and the data is transmitted according to a multi-carrier transmission form. The present invention may be applied not only to a power-line transmission field, but also, for a cable transmission field, ADSL, VDSL, CATV and so forth, and, for a wireless transmission field, wireless LAN of 2.4 GHz, digital broadcasting, and so forth, and, also, for an optical data transmission field, WDM, and so forth.

2. Description of the Related Art

A system for transmitting data through various kinds of transmission paths such as a cable, radio, and so forth, has been used, and improvement for stable data transmission and improvement of transmission rate are demanded. Moreover, various proposals also for a system for utilizing an existing telephone line or an existing power line as a cable data transmission system have been made. Moreover, for example, as there is an existing power distribution system by which electric power is supplied to each transformer through a 6.6 kV high-voltage power line, and the voltage is lowered to 100 V or 200 V by each transformer, and then, the electric power is supplied to consumers, such as each home, through a low-voltage power line, various proposals for a data transmission system utilizing this low-voltage power line as a data transmission path have been made.

In such a data transmission system utilizing a low-voltage power line, on the side of a high-voltage power line, an optical fiber transmission path is laid along the high-voltage power line, then, at a position of a transformer, a modem is used to connect the optical fiber transmission path with the low-voltage power line, and, also, a modem is used to connect between each terminal apparatus and the low-voltage power line. Thus, data transmission is performed by utilizing the low-voltage power line as a data transmission path.

In such a case, generally speaking, the low-voltage power line includes, for example, an inductance component on the order of 1 μH/m and a capacitance component on the order of 75 pF/m. Therefore, in a case of incoming lines of 150 m and 50 m×30 (houses), equivalently, an inductance of 150 μH and a capacitance of 0.1125 μF are connected. Further, as, in many cases, capacitors for noise prevention is connected to various kinds of household-electric-appliances, the impedance of the power line has a relatively large capacitance. Moreover, in many cases, an inverter drive form is applied to various kinds of household-electric-appliances, and, noises generated from the inverters are inserted into the power line.

Therefore, when using such a low-voltage power line as a data transmission path, data is transmitted through a low-path filter equivalently, thereby, a high-frequency component of the signal attenuates remarkably, and, the signal will contain various noises, in many cases. Moreover, in such a case, although there is comparatively little attenuation of a low-frequency component, noise occurring due to an inverter unit etc. may have many low-frequency components. Therefore, low-frequency components of a signal may include various noises. Moreover, as such a low-voltage power line branches to plurality of lines in general, and, also, no proper impedance matching is performed on each termination end, signal reflection may occur and also problems due to multipath phenomenon may occur.

A system for transmitting data in parallel using a multi-carrier transmission form for a provision for problem concerning mulitpath and line equalization is also known. For example, an OFDM (Orthogonal Frequency Divisional Multiplexing) transmission form, and a DMT (Discrete Multitone) transmission form are known. When such a multi-carrier transmission form is applied, as it is possible to assign a carrier avoiding a frequency band having a large noise level, it becomes possible to transmit data through a low-voltage power line even including many noise components mentioned above. Moreover, as a system in which parallel transmission of data is carried out by the multi-carrier transmission form, for example, an ADSL (Asymmetric Digital Subscriber Line) transmission form is known as a transmission form directed to a high-rate data transmission through a telephone line.

This multi-carrier transmission form is such that transmission data is transformed into parallel form, and modulation is performed by using each carrier having different narrow band, and, in general, a quadrature amplitude modulation (QAM) form is used. Thus, since transmission data is transmitted in parallel, it becomes possible to equivalently reduce the data band rate per channel, therefore to transmit the data by the data transmission path of the low-voltage power line even including much noise, etc.

In the above-mentioned DMT transmission form and OFDM transmission form, it is common to use an inverse fast Fourier transform (IFFT) form and a fast Fourier transform (FFT) form. Moreover, while using error correction code, applying an interleaving technology is also known.

The applicant of the present application previously proposed a data transmission apparatus (modem) in which the function of a Hadamard transform needing processing easier as compared with the function of Fourier transform is used, and, also, a unit of performing two-dimensional interleaving operation along a time axis and along a frequency axis is employed. FIG. 1 illustrates this data transmission apparatus. In this figure, a transmission signal SD is input to a unit for code transformation such as scrambling (SCR), series-to-parallel conversion (S/P), (gray code)-to-(natural code) conversion (G/N), and summing processing. Further, a signal point generating unit 102, an ADM (Hadamard) multi-plexing unit 103, a time-and-frequency interleaving unit 104, a DMT (Discrete Multitone) processing unit 105 having functions of inverse fast Fourier transform (IFFT) and guard-time adding, a D-A conversion unit (D/A) 106, and a low-path filter (LPF) 107 are provided. Therethrough, the data is sent out through a TX-line (transmission line).

In the same figure, a reception line, RX-line is connected to a band-path filter (BPF) 110. Further, an A-D conversion unit 111, a DMT processing unit 112 having functions of guard-time removal and fast Fourier transform (FFT), an amplitude-and-phase pulling unit 113, a time-and-frequency inverse fast Fourier transform unit 114, an ADM distribution unit 115, a decision unit (DEC) 116, a code transformation unit 117 having functions of differential processing, (natural code)-to-(gray code) conversion (N/G), parallel-to-series conversion (P/S) and descrambling (DISC), and a synchronization processing unit 118 having functions of sub-frame synchronization and master-frame synchronous function, are provided. Therethrough, a reception signal RD is obtained.

The code transformation unit 101 performs scrambling (SCR) operation and series-to-parallel conversion (S/P)

operation on the transmission signal SD, and, then, performs (gray-code)-to-(natural code) conversion (G/N) thereon, so as to generate natural code which can be used for calculation, and, then performs summing operation thereon so that the reception part may perform phase identification by differential calculation. Then, signal points equivalent to sample points at Nyquist intervals are produced by the signal-point generating unit 102. Then, Hadamard transform is performed and, thus, the signal is multiplexed by the ADM multiplex part 103. Then, two-dimensional interleaving along the time axis and along the frequency axis is performed by the time-and-frequency interleaving unit 104. Then, quadrature amplitude modulation guard time addition are performed by the DMT processing unit 105. Then, the data is converted into an analog signal by the D-A conversion unit 106, and the low-path filter 107 passes therethrough only a signal having a frequency band between 10 kHz and 450 kHz, for example, and then, it is sent out to the transmitting line. Instead, a wide transmission band between 2 and 30 MHz may be employed.

The signal having the frequency band between 10 and 450 kHz of the signal received by the reception line RX-line is passed through by the band-pass filter 110 of the reception part, the signal is then converted into a digital signal by the A-D conversion unit 111, DMT demodulation and guard time removal are performed by the DMT processing unit 112, and, by the amplitude-and-phase pulling unit 113, synchronization operation is performed under control of the synchronization processing unit 118. The sub-frame synchronization and master-frame synchronous processing is performed by this synchronization processing part 118.

Then, by the time-and-frequency inverse interleaving unit 114, inverse interleaving operation inverse to the two-dimensional interleaving performed by the time-and-frequency interleaving unit 104 of the transmission end is performed. Then, the ADM distribution unit 115 performs operation inverse to the operation performed by ADM multiplexing unit 103 of the transmission end. Then, the decision unit 116 performs data decision operation and thus, restores the transmission data. Then, the code transformation unit 117 performs differential operation, (natural code)-to-(gray code) conversion (N/G), parallel-to-serial conversion (P/S), and descrambling (DSCR) operation. Thus, the reception signal RD is obtained.

As noise components problematically inserted into the data transmission path is of random ones. For example, FIGS. 2A and 2B illustrate noise characteristics, where the vertical axis represents the signal power while the horizontal axis represents the frequency. As shown in FIG. 2A, the noise changes randomly along the time axis and frequency axis. Then, as mentioned above, by performing quadrature amplitude transform such as Hadamard transform (ADM) or Wavelet transform, etc., and two-dimensional interleaving at the transmission end, and performing inverse interleaving and inverse Hadamard transform etc. at the reception end, the noise components are averaged or equalized, and, thus, have an approximately uniform level, as shown in FIG. 2B. Therefore, since equalization of noise is thus attained, stable data transmission becomes possible.

FIG. 3 illustrates another example of a data transmission apparatus which the applicant of the present application proposed in the past. The same reference numerals are given to the same units as those of FIG. 1. In the configuration of FIG. 3, a roll-off filter and modulation unit (ROF MOD) 108 and a demodulation and roll-off filter unit (DEM ROF) 119 are provided. That is, the roll-off filter and modulation unit 108 is provided between the DMT processing unit 105 and D-A conversion unit 106 in the transmission part shown in FIG. 1, and the demodulation and roll-off filter unit 119 is provided between the A-D conversion unit 111 and the DMT processing unit 113 of the reception part thereof.

The roll-off filter and modulation unit 108 of this data transmission apparatus performs wave shaping operation and digital modulation such as quadrature amplitude modulation on the signal having undergone guard time addition by the DMT processing unit 105. Then, the signal is converted into an analog signal by the D-A converting unit 106, and, then, by the low-pass filter 107, the signal is made to have a predetermined frequency band, and is sent out to the transmission line TX-line. By the demodulation and roll-off filter unit 119, the digital demodulation of the digital signal obtained from the A-D conversion part 111 is carried out, wave shaping operation is carried out by the roll-off filter, and, then, it is input to the DMT processing unit 112.

Then, the DMT demodulation and removal of the guard time are performed by the DMT processing unit 112, synchronization pulling is performed by the amplitude-and-phase pulling unit 113, inverse interleaving is performed by the time-and-frequency inverse interleaving unit 114, operation inverse to the operation performed by the ADM multiplexing unit 103 of the transmission end is performed by the ADM distribution unit 115, the decision unit 116 performs data decision/restoration, and, by the code transformation unit 117, differential operation, (natural code)-to-(gray code) conversion (N/G), parallel-to-series conversion (P/S) and descrambling (DSCR) are performed. Thus, the reception signal RD is obtained.

FIG. 4 illustrates another data transmission apparatus employing a noise removal unit proposed by the applicant of the present application in the past. The same reference numerals as those of FIG. 3 are given to the same units. In the configuration shown in FIG. 4, a zero-point insertion unit 109 and a noise removal unit 120 are provided. The zero-point insertion unit 109 inserts one or a plurality of zeros (zero levels) between signal points of the signal output from the DMT processing unit 105. The noise removal unit 120 extracts noise components accompanying the zero points, obtains noise components accompanying the signal points by processing interpolation operation of the thus-obtained noise components of the zero points, and removes the noise components accompanying the signal points.

FIG. 5 illustrates the noise removal unit which includes a transmission signal generating unit 131 including the code conversion unit, time-and-frequency interleaving unit, etc. of the transmission part, a zero point insertion unit 132 equivalent to the zero point insertion unit 109 shown in FIG. 4, a data transmission paths 133 such as a low-voltage power line, a telephone line, a radio circuit, or the like, a reception signal reproduction unit 134 including the DMT processing unit, time-and-frequency inverse interleaving unit, etc. of the reception part, and the noise removal unit 120 shown in FIG. 4, a frequency shift unit 121, a thinning-out unit (DCM) 122, an interpolation unit (IPL) 123, and a frequency inverse shift unit 124, and a subtraction unit 125.

Into the signal S of 192 kB (bands) given from the transmission signal-generating unit 131 shown in FIG. 6, (1), one zero point is inserted between signal points by the zero point insertion unit 132, thus the transmission rate becomes equivalent to twice, 384 kB. Further, as shown in FIG. 6, (2), it corresponds to the case where the number of sample points thus becomes twice along the time axis. In the figure, curves shows a state of an example of amplitude-modulated signal.

When transmission of the transmission signal before zero point insertion is made by 192 kHz, it comes to have a twice frequency band, i.e., 384 kHz by the above-mentioned zero point insertion. Since the signal transmitted through the data transmission path 133 has noise added thereto due to various causes mentioned above, the noise N is added to each signal point and also to each zero point, as shown in FIG. 6, (3). With regard to the frequency axis, the signal inputted into the noise removal unit 120 shown in FIG. 4 is such as that shown in 'noise distribution', (1) of FIG. 5, for example. The signal components in this case are shown as a frequency band in a range between −192 kHz and +192 kHz assuming that the central frequency is 0 kHz. As described above, the level of the band components A, B, C, and D are such that A>B>C and D as the noise component in a lower frequency range is higher in level.

The noise removal unit 120 has a configuration including the frequency shift unit 121, thinning-out unit 122, interpolation unit 123, frequency inverse shift unit 124, and subtraction unit 125, and performs a (96 kHz) frequency shift by the frequency shift unit 121. Thereby, as shown in FIG. 5, (2) '+96 kHz shift', the output of the frequency shift unit 121 is such that, the band component A in the range between −192 kHz and −96 kHz is shifted to the range between −96 kHz and 0 kHz; the band component B in the range between −96 kHz and 0 kHz is shifted to the range between 0 and +96 kHz; the band component C in the range between 0 kHz and +96 kHz is shifted to the range between +96 kHz and +192 kHz; and, the band component D in the range between +96 kHz and +192 kHz is shifted to, by turning, the range between −192 kHz and −95 kHz.

Then, by the following thinning-out unit 122, the signal point shown as S+N of the reception signal of FIG. 6, (3), along the time axis, for example, is thinned out. Thereby, only the signal components at the zero points remain, as shown in FIG. 5, (3) 'thinning out (DCM)', along the frequency axis. Each arrow in this figure shows band component produced by turning. By the next interpolation unit 123, the noise at the signal point S is obtained by processing interpolation using the noise N at the zero points, and the noise N' at the signal point between the zero points is obtained by the noise N at the zero points, as shown in FIG. 6, (4). Along the frequency axis, the band in the range between −192 kHz and +192 kHz becomes half, into the range between −96 kHz and +96 kHz, as shown in FIG. 5, (4) 'interpolation' (IPL).

In this case, since the frequency band of the noise components thus obtained by the interpolation process is different from the low-frequency band having much noise shown in FIG. 5, (1) 'noise distribution', the frequency inverse shift unit 124 performs a (96 kHz) frequency shift. Thereby, it is shifted to the frequency band in the range between −192 kHz and 0 kHz as shown in FIG. 5, (5) '−96 kHz shift', and is input to the subtraction unit 125. By this subtraction unit 125, the signal shown in FIG. 5, (5) '−96 kHz shift' of the output of the frequency inverse shift unit 124 is subtracted from the reception signal shown in FIG. 5, (1) 'noise distribution'. As a result, the low-frequency noise component is removed, as shown by the broken line shown in FIG. 5, (6) 'noise removal'. As shown in FIG. 6, (5), the output of the subtraction unit 125 is such that the noise has been removed, and only the signal components S remain. Thus, the transmission signal shown in FIG. 5, (1) 'transmission 192 kB' can be restored.

FIG. 7 shows one example of the sampled values and spectrums in the thinning-out unit 122 shown in FIG. 5. In the figure, the left parts of (1) through (4) show the sampled values in amplitude along the time axis while the right parts thereof show the spectrums. With regard to (1) 'sampled values and spectrums for the signal S(n)', a value A obtained by Z transform performed on the signal S(n) is expressed by the following formula:

$$A = S(z) = \Sigma S(n) z^{-n}$$

The thus-obtained spectrum is in the range between 0 and fs/2, where fs represents the sampling frequency.

With regard to (2) 'sampled values and spectrums for the signal $(-1)^n * S(n)$', that is, the a value B obtained by Z transform of the inverted signal of the signal S(n) is expressed by the following formula:

$$B = Z[(-1)^n S(n)] = S(-z)$$

In this case, only the signal components in the signal points are inverted, and, the spectrum obtained therefrom becomes the inverted one. When this inverted signal and the signal before the inversion are added together, (3) 'sampled value and spectrum of the signal t(n)' are obtained. A value C obtained from Z transform of the signal obtained through this addition is expressed by the following formula:

$$C = Z[t(n)] = T(z) = (\tfrac{1}{2}) * [S(z) + S(-z)]$$

where, as the signal t(n) is such that each of t(1), t(3), t(5), . . . is 0, it can be expressed as:

$$T(z) = \Sigma t(2n) * Z^{-2n}.$$

A signal D obtained from thinning out each signal point at t(n) =0 can be expressed as:

$$D = u(n) = T(z^{1/2})$$

and the final signal E is expressed by the following formula:

$$E = u(z) = [S(z^{1/2}) + S(-z^{1/2})]/2$$

Thus, it becomes one shown in (4) 'sampled values and spectrum of the signal u(n)'. Thus, the frequency band is halved and, the result is inputted into the interpolation unit 123 (see FIG. 5).

FIG. 8 shows interpolation processing in the interpolation unit 123. (1) 'sampled values and spectrum of the signal u(n) corresponds to (4) ' sampled values and spectrum of the signal u(n) shown in FIG. 7. The signal u(n) from the thinning-out unit 122 only includes the noise components. When the zero points are inserted thereto, (2) 'the sampled values and spectrum of the signal t(n)' shown in the figure are obtained. A value F obtained from Z transform of this interpolated signal t(n) is expressed by the following formula:

$$F = T(z) = \Sigma t(n) z^{-n}$$

As each of t(1), t(3), t(5), . . . , is 0, $$F = \Sigma t(2n) z^{-n} = u(n) z^{-2n}$$

Accordingly, $$T(z) = U(z^2)$$

and, thus, the spectrum comes to have a frequency band in the range between 0 and fs/2 by turning of the range between 0 and fs/4, as shown in the figure.

As this signal T(z) has the same rate as the signal S(n) and only includes the noise components, the noise components are removable from the reception signal by generating the signal therefrom only having the frequency band of the reception signal by the frequency inverse shift unit 124 (see FIG. 5), and carrying out the subtraction processing by the subtraction unit 125.

Furthermore, an example of a timing generating unit in the synchronization processing unit 118 (see FIG. 4) is shown in FIG. 9. As shown in this figure, a timing extraction unit 140, a phase synchronization unit 150, a power calculation unit (PWR) 141, a band-pass filter (BPF) 142, a vector-generation unit 143, a comparison unit 151, a D-A conversion unit (D/A) 154, a voltage control crystal oscillator (VCXO) 155, a low-path filter (LPF) 152, a frequency dividing unit 156, and a secondary phase synchronization circuit (secondary PLL) 153 are provided.

The vector signal inputted from the roll-off filter (ROF) (the roll-off filter of the demodulation and roll-off filter unit 119 shown in FIG. 4) is processed according to square operation by the power calculation unit 141, and, thus, the power thereof is calculated. Since the above-mentioned zero-point insertion is such that the zero points are inserted at fixed intervals, the frequency components thereof are extracted by the band-path filter 142. For example, the extraction is made where 192 kHz is regarded as the central frequency. Then, by the vector generation unit 143, a vector is generated, that is, combination with signal in quadrature phase is performed, and, then, the result is input to the phase synchronization unit 150.

The comparison unit 151 carries out phase comparison of the output signal of the timing extraction unit 140 with the frequency dividing output signal of the frequency divider 156, and inputs the difference therebetween into the secondary phase synchronization circuit 153 through the low-path filter 152. Two integrators may be included in this secondary phase synchronization circuit L53. The output signal of this secondary phase synchronization circuit 153 is converted into a control voltage of an analog signal by the D-A conversion unit 154, and, thereby, the oscillation frequency of the voltage-controlled crystal oscillator 155 is controlled. The output signal of this voltage-controlled crystal oscillator 155 is input to the A-D conversion unit 117 (see FIG. 4) as a sampling clock signal, and, also, this signal undergoes frequency division by the frequency divider 156, and is regarded as the zero point signal. That is, it is input to the noise removal unit 120 (see FIG. 4) as a timing signal of the zero points.

However, in a system for transmitting data by the multi-carrier transmission form, in order to perform link equation in a reception end, at least 16 channels are needed. In order to obtain two-dimensional interleaved output for these 16 channels, 256 channels of data is needed.

For example, FIG. 10 shows only a transmission part of the data transmission apparatus shown in FIG. 4. In the figure, the number of channels is added thereto for easy understanding, and since 16 channels of data after performing the two-dimensional interleaving operation is to be outputted from the time-and-frequency interleaving unit 104, the ADM multiplex unit 103 should process 256 channels of data and output 16 channels of data (on the input end, 1 sample is included in each channel while, on the output end, 16 samples are included in each channel there). As the zero point insertion unit 109 inserts the zero points between the signal points for 16 channels of data-given from the DMT processing unit 105, the zero point insertion unit 109 outputs 32 channels of data.

By the time-and-frequency interleaving unit 104, as shown in FIG. 11, two-dimensional interleaving processing of 256 points of data along the frequency axis in the range between CH1 and CH16 and along the time axis in the range between 1 and 16 is carried out, and 16 channels of data is outputted along the time axis, for example. Thus, since 256 points of data is needed in order to obtain the two-dimensional interleaved output of 16 channels, a problem in that PAR (Peak to Average Ratio) increases may occur. Assuming that the number of channels is n, as PAR=3.01+10 log n [dB], PAR=27[dB] when n=256. Then, in order to solve this problem, to reduce the level may be possible. However, the reception level is also reduced due to this level reduction, reception S/N is remarkably degraded thereby, and, thus, stable data transmission may become impossible.

SUMMARY OF THE INVENTION

The minimum 16 channels may be needed for enabling link equation on the reception end, and, in order to perform effective interleaving while 16 channels are ensured, the minimum 256 channels may be needed in case of performing the ADM transform. However, as the number of signal points thus increases, the above-mentioned PAR increases, and, thereby, the signal to noise ratio on the reception end is degraded. In order to solve this problem, the present invention reduces the number of signal points so as to effectively reduce the PAR.

The present invention is directed to achievement of predetermined two-dimensional interleaving with a reduced number of channels, and achievement of zero point insertion equivalently. Moreover, another object of the present invention is to make uniform originally non-uniform noise having different characteristics between the time axis and frequency axis, by two fast Fourier transform units (FFT) on the reception end and two-dimension inverse interleaving unit provided between these fast Fourier transform units there. Further, another object of the present invention is to prevent the number of channels of the fast Fourier transform unit from increasing.

In a data transmission method according to the present invention, with reference FIG. 12, two-dimensional interleaving is performed along a time axis and along a frequency axis, also, data is transmitted by a multi-carrier transmission form, a process of forming data by channel-copy is performed, which data is short for the number of channels required for the fast inverse Fourier transform performed before and after the two-dimensional interleaving performed by a time-and-frequency interleaving unit 6.

Moreover, by the channel copy, the data of the number of channels required for the fast inverse Fourier transform is provided, then, zero points equivalently generated along the time axis by the channel copy is removed after the fast inverse Fourier transform, and then, the thus-obtained data is input to the time-and-frequency interleaving unit 6 which performs the two-dimensional interleaving. Zero points are equivalently generated along the time axis by the channel copy, thus, the data of the number of channels required for a first fast inverse Fourier transform unit 4 provided antecedently to the time-and-frequency interleaving unit 6 is provided, the zero points produced by the above-mentioned channel copy included in the inverse Fourier transform output of this first fast inverse Fourier transform unit 4 are then removed, and the thus-obtained data is input to the time-and-frequency interleaving unit 6 performing the two-dimensional interleaving. The thus-obtained two-dimensional interleaving output of this time-and-frequency interleaving unit 6 is made to be the data of the number of channels required for the second fast inverse Fourier transform unit 8 subsequent to the time-and-frequency interleaving unit 6 also by the channel copy. Moreover, the number of channels required for the first fast inverse Fourier transform unit 4 antecedent to the time-and-frequency interleaving unit 6 is made equal to the number of channels required for the second fast inverse Fourier transform unit 8 subsequent thereto.

Moreover, in a data transmission method for performing two-dimensional interleaving along the time axis and along the frequency axis, and transmitting data by the multi-carrier transmission form, the number of channels required for the first fast inverse Fourier transform unit antecedent to the time-and-frequency interleaving unit performing the two-dimensional interleaving may be produced by zero value addition directly.

The data transmission apparatus according to the present invention thus performs two-dimensional interleaving along the time axis and along the frequency axis, and transmits data by the multi-carrier form. With reference to FIG. 12, the data transmission apparatus includes channel copy units 3 and 7 which produce an amount of data which is short for the number of channels required for the fast inverse Fourier transform units provided before and after the two-dimensional interleaving is performed, by channel copy operation.

The time-and-frequency interleaving unit 6 performing this two-dimensional interleaving, and the first fast inverse Fourier transform unit 4 antecedent to this time-and-frequency interleaving unit 6 and the second fast inverse Fourier transform unit 8 subsequent thereto, the first and second channel copy units 3 and 7 which produce the data of the number of channels required for the first and second fast inverse Fourier transform units 4 and 8, through the channel copy operation, and a zero point removal unit 5 which removes the zero points produced by the above-mentioned data copy (channel copy) included in the inverse Fourier transform output of the first fast inverse Fourier transform unit 4, are provided. Moreover, the number of channels of the first fast inverse Fourier transform unit 3 antecedent to the time-and-frequency interleaving unit 6 and the number of channels of the second fast inverse Fourier transform unit 8 subsequent to the time-and-frequency interleaving unit 4 may be set to be the same as one another.

Moreover, a data transmission apparatus according to the present invention performs two-dimensional interleaving along the time axis and along the frequency axis, and transmits data by the multi-carrier transmission form, and, further, may includes a time-and-frequency interleaving unit performing two-dimensional interleaving, the first fast Fourier transform unit antecedent to and a second fast inverse Fourier transform unit subsequent to this time-and-frequency interleaving unit, and a zero value addition unit which produces the number of channels required for the first fast inverse Fourier transform unit by direct zero point addition. Further, a thinning-out processing unit may be provided which thins out zero values corresponding to the zero values thus added by the above-mentioned zero value addition from the inverse Fourier transform output of the fast inverse Fourier transform unit.

Thereby, according to the present invention, two-dimensional interleaving is performed along the time axis and along the frequency axis, and the data is transmitted by the multi-carrier transmission form. In the reception part, two-dimensional inverse interleaving is performed by the time-and-frequency inverse interleaving unit provided between first and second fast Fourier transform units (FFT) 25 and 30, and, thus reception processing is carried out there. Thereby, equalization of noise components within the relevant band is achieved. Accordingly, even when a data transmission path having large fluctuation/unevenness in noise such as a low-voltage power line as mentioned above, stable data transmission can be performed. Moreover, the number of channels which is short for the number of channels required for the fast inverse Fourier transform can be easily obtained by channel copy, i.e., copying of channels of data.

BRIEF DESCRIPTION OF THE DRAWINGS

Other objects and further features of the present invention will become more apparent from the following detailed description when read in conjunction with the following accompanying drawings.

FIG. 1 illustrates a data transmission apparatus proposed by the applicant in the past:

FIG. 7 illustrates thinning out operation;

FIG. 8 illustrates interpolation operation;

FIGS. 14A through 14H illustrate zero point insertion operation performed by the apparatus shown in FIG. 12;

FIGS. 15A, 15B, 16A and 16B illustrate two-dimensional interleaving operation performed by the apparatus shown in FIG. 12;

FIGS. 17A through 17D illustrate zero point insertion and noise removal performed by the apparatus shown in FIG. 12;

FIGS. 18A through 18D illustrate various forms of zero point insertion according to the present invention;

FIG. 22 illustrates comparison in performance between various modulation forms in the related art and the present invention.

DETAILED DESCRIPTION OF THE PREFERRED EMBODIMENTS

Figure 12:
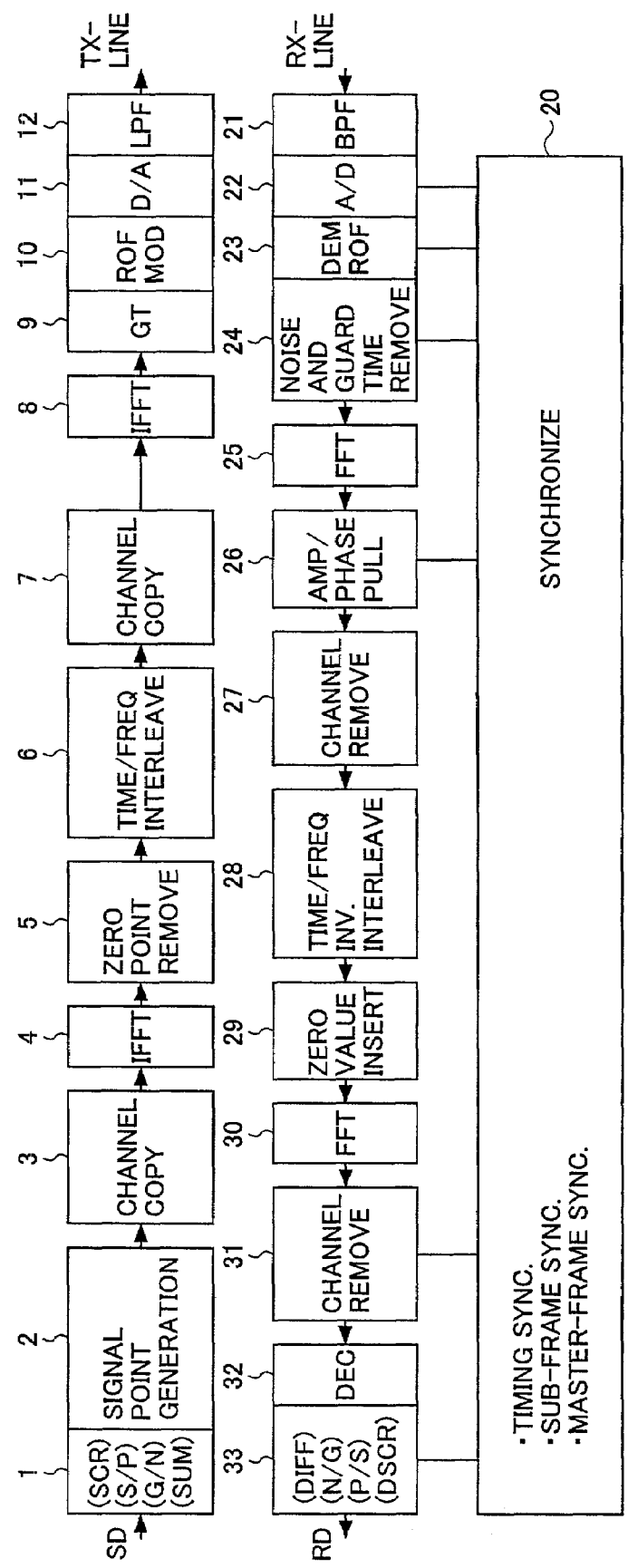
FIG. 12 shows a block diagram of a data transmission apparatus in a first embodiment of the present invention.

FIG. 12 illustrates a data transmission apparatus in a first embodiment of the present invention. In this data transmission apparatus, a transmission signal SD is input to a code conversion unit 1, and, further, the apparatus includes a signal point generating unit 2, a first channel copy unit 3, a first fast inverse Fourier transform unit (IFFT) 4, a zero point removal unit 5, a time-and-frequency interleaving unit 6, a second channel copy unit 7, a second fast inverse Fourier transform unit (IFFT) 8, a guard time insertion unit (GT) 9, a roll-off filter and modulation unit (ROFMOD) 10, a D-A conversion unit (D/A) 11, and a low-path filter (LPF) 12. The thus-processed transmission signal is sent out through a transmission circuit, TX-line. The above-described configuration is of a transmission part of the data transmission apparatus.

On the other hand, through a reception circuit RX-line, a transmission signal is received by the data transmission apparatus. Then, this signal is input to a band-path filter (BPF) 21. The apparatus further includes a synchronization processing unit 20, an A-D conversion unit (A/D) 22, a demodulation and roll-off filter unit (DEMROF) 23, a noise and guard time removal unit 24, a first fast Fourier transform unit (FFT) 25, an amplitude-and-phase pulling unit 26, a first channel removal unit 27, a time-and-frequency inverse interleaving unit 28, a zero point insertion unit 29, a second fast Fourier transform unit 30, a second channel removal unit 31, a decision unit (DEC) 32, and a code conversion unit 33. Therethrough, a reception signal RD is obtained. The above-described configuration is of a reception part of the data transmission apparatus.

The code conversion unit 1 has a function of scrambling (SCR), serial-to-parallel conversion (S/P), (gray code)-to-(natural code) conversion (G/N), and summing operation. The signal point generating unit 2 generates signal points based on the output of the code conversion unit 1, and the first channel copy unit 3 copies the channels of data, and, thus, generates zero points along the time axis equivalently. Thereby, the number of channels of data to be inputted into the first fast inverse Fourier transform unit 4 is provided. After the inverse Fourier transform is performed by this first fast inverse Fourier transform unit 4, the zero point removal unit 5 removes the zero points corresponding to the above-mentioned data copy, and the thus-obtained data is input to the time-and-frequency interleaving unit 6.

By copying the channels of data by the second channel copy unit 7 after performing two-dimensional interleaving by the time-and-frequency interleaving unit 6, zero points are generated along the time axis equivalently, and, the number of channels of data to be inputted to the second fast inverse Fourier transform unit 6 is provided. After inverse Fourier transform thereby, a guard time is inserted by the guard time insertion unit 9. By the roll-off filter and modulation unit 10, wave shaping and digital modulation are performed. Then, the data is converted into an analog signal by the D-A conversion unit 11, and is sent out to the transmission circuit TX-line through the low-path filter 12.

The signal received through the reception circuit RX-line is input to the band-pass filter 21, and only a predetermined frequency band of the received signal is input to the A-D converter conversion unit 22 through the band-pass filter 21, and, thus, the signal is converted into a digital signal. By the demodulation and roll-off filter unit 23, digital demodulation and wave shaping are performed, and, then, by the noise and guard time removal unit 24, the noise and guard time are removed. Then, Fourier transform is performed and thus transformation from the time axis to the frequency axis is performed by the fast Fourier transform unit 25. Then, synchronization pulling is performed for the signal points by the amplitude-and-phase pulling unit 25. The channels corresponding to the zero points inserted by the channel copy operation performed at the transmission end are removed by the first channel removal unit 27. Then, the thus-obtained signal is input to the time-and-frequency inverse interleaving unit 28.

Two-dimension inverse interleaving is performed by the time-and-frequency inverse interleaving unit 28. Then, zero points are inserted by the zero value insertion unit 29, thereby, the predetermined number of channels are provided. Then, fast Fourier transform is performed by the second fast Fourier transform unit 30. By the channel removal unit 31, the channels corresponding to the above-mentioned zero point insertion are removed. The decision unit 32 performs data decision, the code conversion unit 33 performs differential operation, (natural code)-to-(gray code) conversion (N/G), parallel-to-series conversion (P/S), and descrambling (DSCR). Thus, the reception signal RD is obtained.

The synchronization processing unit 20 including a timing extraction unit and a phase synchronization unit therein, performs thereby timing synchronization, sub-frame synchronization, and master-frame synchronization based on the output signal of the roll-off filter of the roll-off filter and demodulation nit 24, and supplies appropriate clock signals or timing signals to the respective units.

Figure 13:
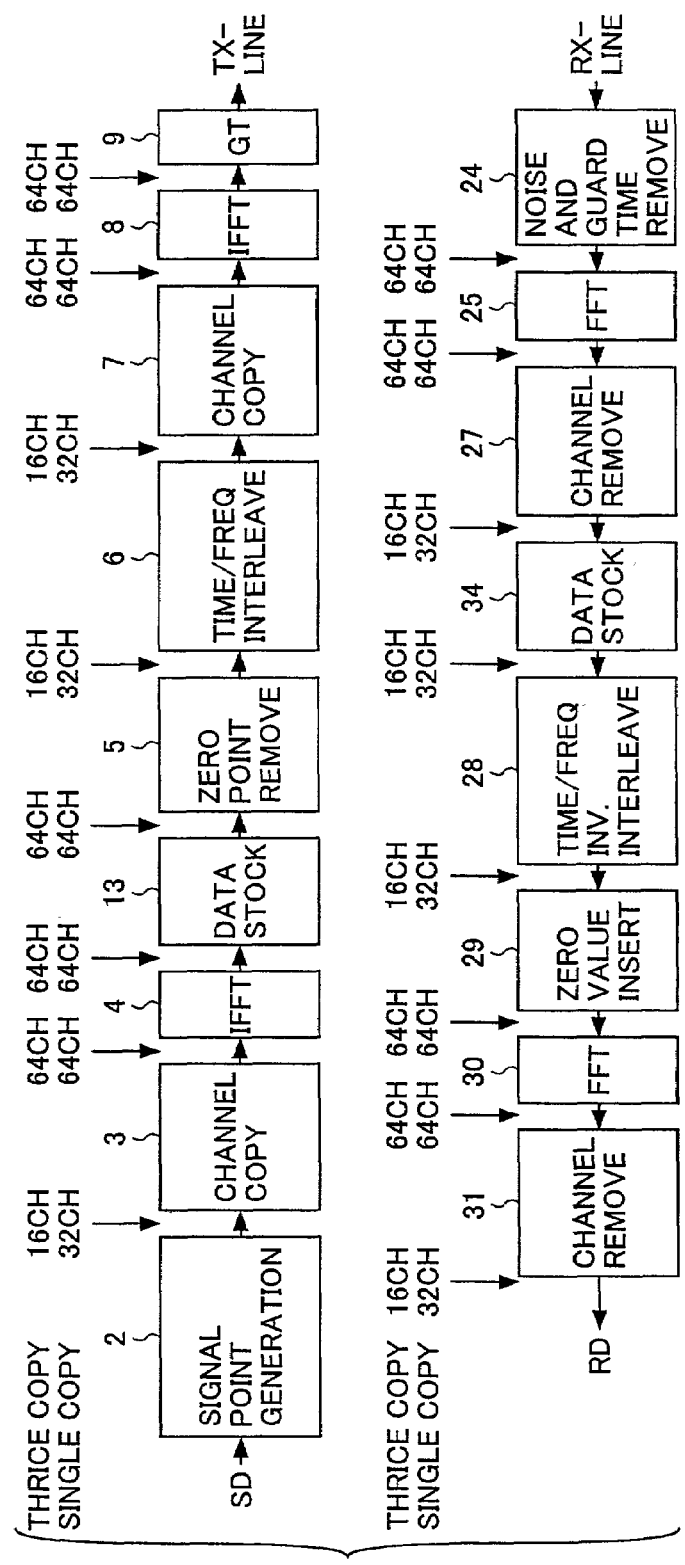
FIG. 13 shows transition of the number of channels in the configuration shown in FIG. 12.

FIG. 13 illustrates the number of channels, and shows an example of transition of the number of channels (CH) provided by each unit of the transmission part and reception part of the data transmission apparatus shown in FIG. 12. As shown in the figure, data stock is performed by buffer memories or the like 13 and 34. This example is an example in which the numbers of channels processed by the first and second fast inverse Fourier transform units 4 and 8 (IFFT), and the first and second fast Fourier transform units 25 and 30 (FFT) are the same as each other, for example, as 64. Thereby, the inverse Fourier transform of the first and second fast inverse Fourier transform units 4 and 8 can be performed by using the same software program, and, also, the fast Fourier transform by the first and second fast Fourier transform units 25 and 30 can be performed by using the same software program.

Each of the first and second channel copy units 3 and 7 has a function of copying data, and, thus, equivalently inserts one zero point between each adjacent signal points along the time axis in a case where the number of data copy is set to be 1. Similarly, it equivalently inserts three zero points between each adjacent signal points along the time axis equivalently in a case where the number of data copy is set to be 3. That is, the number of zero points corresponding to the number of copy are inserted between each adjacent signal points. The first channel removal unit 25 deletes the number of channels of data, i.e., zero points, corresponding to the number of channels of data generated through data copy performed by the second channel copy unit 7.

In the signal point generating unit 2 of the transmission part, in a case where the ratio of the number of zero points and the number of data is 1:1, for example, the signal points for 32 channels are formed there, then each channel is copied, that is, single data copy operation is performed by the first channel copy unit 3, and, thereby, the total 64 channels of data, which is required by the first fast inverse Fourier transform unit 4, is provided and input to the first fast inverse Fourier transform unit 4. Similarly, in a case where the signal points for 16 channels are formed by the signal point generating unit 2, then each channel is copied thrice, that is, three times of data copy operations are performed by the first channel copy unit 3, and, thereby, the total 64 channels of data, which is required by the first fast inverse Fourier transform unit 4, is provided and input to the first fast inverse Fourier transform unit 4. Therefore, as described above, the first fast inverse Fourier transform unit 4 can have the fixed number of channels of data input thereto through appropriate selection of the number of copying operations in the channel copy unit 3, even when the number of channels given by the signal point generating unit 2 differs.

The output data for 64 channels from the first fast inverse Fourier transform unit 4 is stocked by the data stock 13, the zero point removal unit 13 removes the zero points, and the thus-obtained data is input to the time-and-frequency interleaving unit 6. That is, a single zero point is deleted each time when the single zero point has been inserted each time by the above-mentioned channel copy. When three zero points are inserted each time by the channel copy, these three zero points are removed each time accordingly.

The time-and-frequency interleaving unit 6 performs two-dimensional interleaving for the 32 channels or for the 16 channels after the zero points are thus removed therefrom, then zero point insertion is performed along the time axis by the channel copy by the channel copy unit 7, and the thus-obtained data is input to the second fast inverse Fourier transform unit 8 as data for 64 channels. A guard time is inserted for the data for 64 channels output from this second fast inverse Fourier transform unit 8 by the guard time insertion unit 9 (GT). Then, although being omitted in FIG. 13, by the roll-off filter and modulation unit 10 which are shown in FIG. 12, wave shaping and digital modulation are performed, and the data is converted into an analog signal by the D-A conversion unit 11, and is sent out to the transmission circuit TX-line through the low-path filter 12.

The signal received through receiving circuit RX-line is passed through by the band-path filter 21 for a predetermined band, is converted into a digital signal by the A-D conversion unit 22, is then demodulated and wave-shaped by the demodulation and roll-off filter unit 23, and then undergoes removal of noise and removal of the guard time through the noise and guard time removal unit 24. Thus, the data for 64 channels equivalent to the 64 channels of data output from the fast inverse Fourier transform unit 8 of the transmission end is input to the first fast Fourier transform unit 25.

In this first fast Fourier transform unit 25, after processing inverse to the processing of the second fast inverse Fourier transform unit 8 of the transmission end is performed, the data for 64 channels is outputted therefrom and is input to the channels removal unit 27, and the zero points inserted by the above-mentioned channel copy are removed there, and, thus, 32 channels, or 16 channels of data is sent to and is stored in the data stock 34, and then, is input to the time-and-frequency inverse interleaving unit 28. In this time-and-frequency inverse interleaving unit 28, processing inverse to the processing of the time-and-frequency interleaving unit 6 of the transmission end is performed. Then, in the zero value insertion unit 29, zero points are inserted, and, the thus-obtained data is input to the second fast Fourier transform unit 30 as 64 channels of data. The channels corresponding to the zero points are then removed by the channel removal unit 31 from the Fourier transform output for 64 channels, and, 32 channels or 16 channels of data is thus obtained. Then, although omitted from the figure, the decision unit 32 shown in FIG. 12 performs data decision, and, by the code conversion unit 33, processing inverse to the processing of the code conversion unit 1 of the transmission end is performed, and, thus, the reception data RD is obtained.

FIGS. 14A through 14H illustrate zero point insertion achieved by data copy. FIG. 14A shows a case where data and 0 are input to the fast inverse Fourier transform unit IFFT, and then, fast inverse Fourier transform is performed thereon. This corresponds to a case where a zero point is inserted between signal points. In this case, along the frequency axis, as shown in FIG. 14B, the frequency twice the frequency band obtained in a case where the data alone is processed is obtained. The wave form such as that, as shown in FIG. 14C, is obtained along the time axis in this case.

On the other hand, FIG. 14D shows a case where data is input to the fast inverse Fourier transform unit IFFT in parallel, that is, data and a copy thereof are input simultaneously, and, then, fast inverse Fourier transform is performed thereon. In the case of single copy (parallel input of two sets of the data), as shown in FIG. 14E, the frequency band is doubled along the frequency axis. Along the time axis, as shown in FIG. 14F, one zero point is inserted between each adjacent signal points. Similarly, in a case where data is input to the fast inverse Fourier transform unit IFFT in parallel, but data and three copies thereof are input simultaneously, and, then, fast inverse Fourier transform is performed thereon (parallel input of four sets of the data), as shown in FIG. 14G, the frequency band is made four times along the frequency axis. Along the time axis, as shown in FIG. 14H, three zero points are inserted between each adjacent signal points. That is, by copying each data of the data for 32 channels, by which one zero point is inserted between each adjacent signal points along the time axis, 64 channels can be obtained. Similarly, as three zero points are inserted between each adjacent signal points along the time axis, also 64 channels can be obtained by copying thrice 16 channels of data.

FIGS. 15A and 15B illustrates two-dimensional interleaving operation. FIG. 15A shows a state in which, fast inverse Fourier transform output of the fast inverse Fourier transform unit 4 (IFFT) in the case of single copy is stored in the data stock 13 for 64 channels. As shown in the figure, for '1' along the time axis, for example, samples for 64 channels, i.e., 1CH through 64CH, include zero values (zero samples) for every other channel, i.e., CH2, CH4, CH6, . . . , CH62 and CH64. Then, these zero samples are removed by the zero point removal unit 5, the thus-obtained samples for 32 channels, i.e., CH1 through CH32 are then input to the time-and-frequency interleaving unit 6, and two-dimensional interleaving is performed thereon. FIG. 15B shows an example of the result thereof.

Similarly, FIGS. 16A and 16B illustrate two-dimensional interleaving operation for the case of thrice copying operation. FIG. 16A shows a state in which, fast inverse Fourier transform output of the fast inverse Fourier transform unit 4 (IFFT) in the case of thrice copying operation is stored in the data stock 13 for 64 channels. As shown in the figure, for '1' along the time axis, for example, samples for 64 channels, i.e., 1CH through 64CH, include three zero values (zero samples) for every four channels, i.e., CH2, CH3, CH4, . . . , CH62, CH63 and CH64. That is, three zero samples are inserted between each adjacent original samples. Then, these zero samples are removed by the zero point removal unit 5, the thus-obtained samples for 16 channels, i.e., CH1 through CH16 are input to the time-and-frequency interleaving unit 6, and two-dimensional interleaving is performed thereon. FIG. 16B shows an example of the result thereof.

Figure 2B:
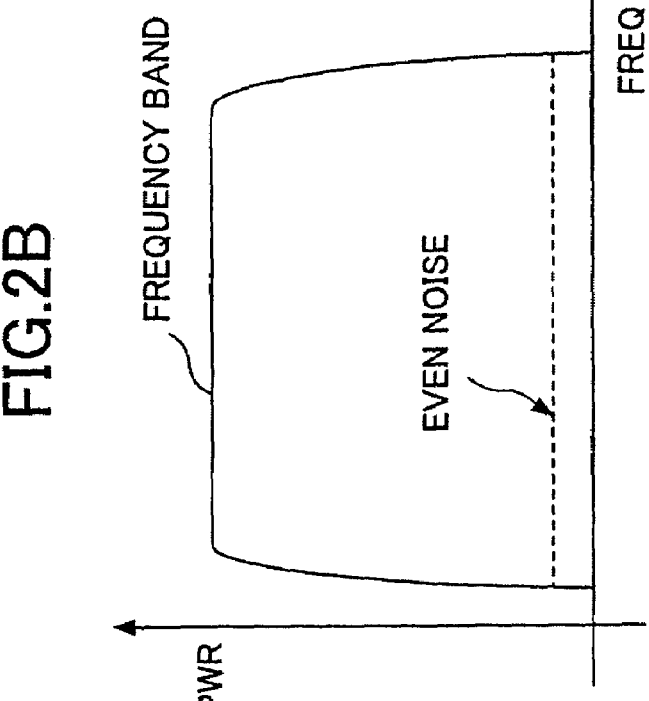
FIGS. 2A and 2B illustrate noise characteristics.
Figure 2A:
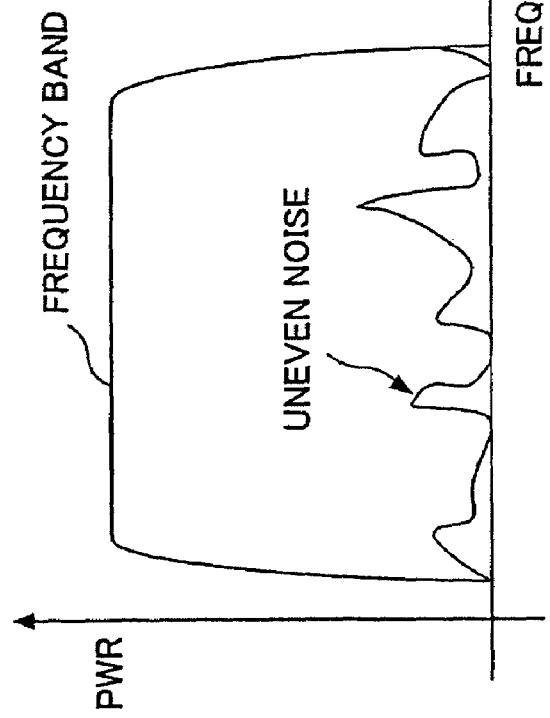
Figure 3:
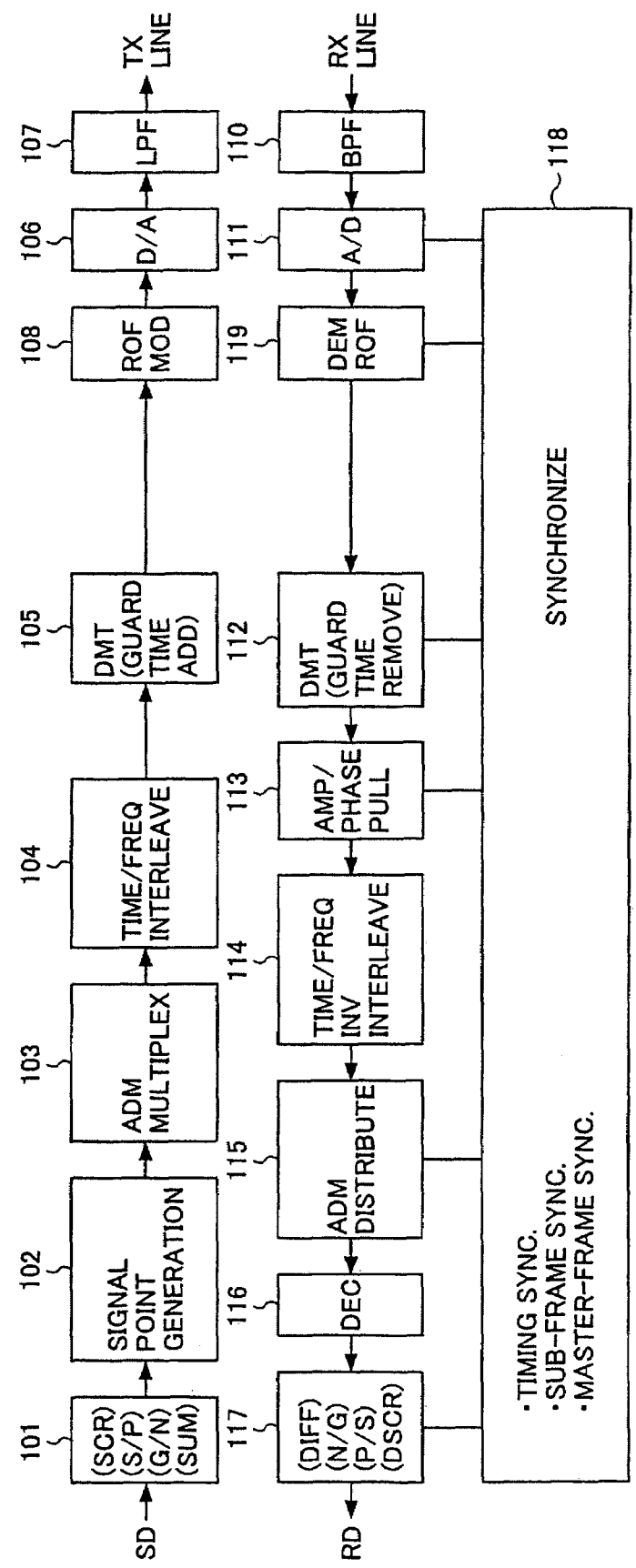
FIG. 3 illustrates another data transmission apparatus proposed by the applicant in the past.
Figure 4:
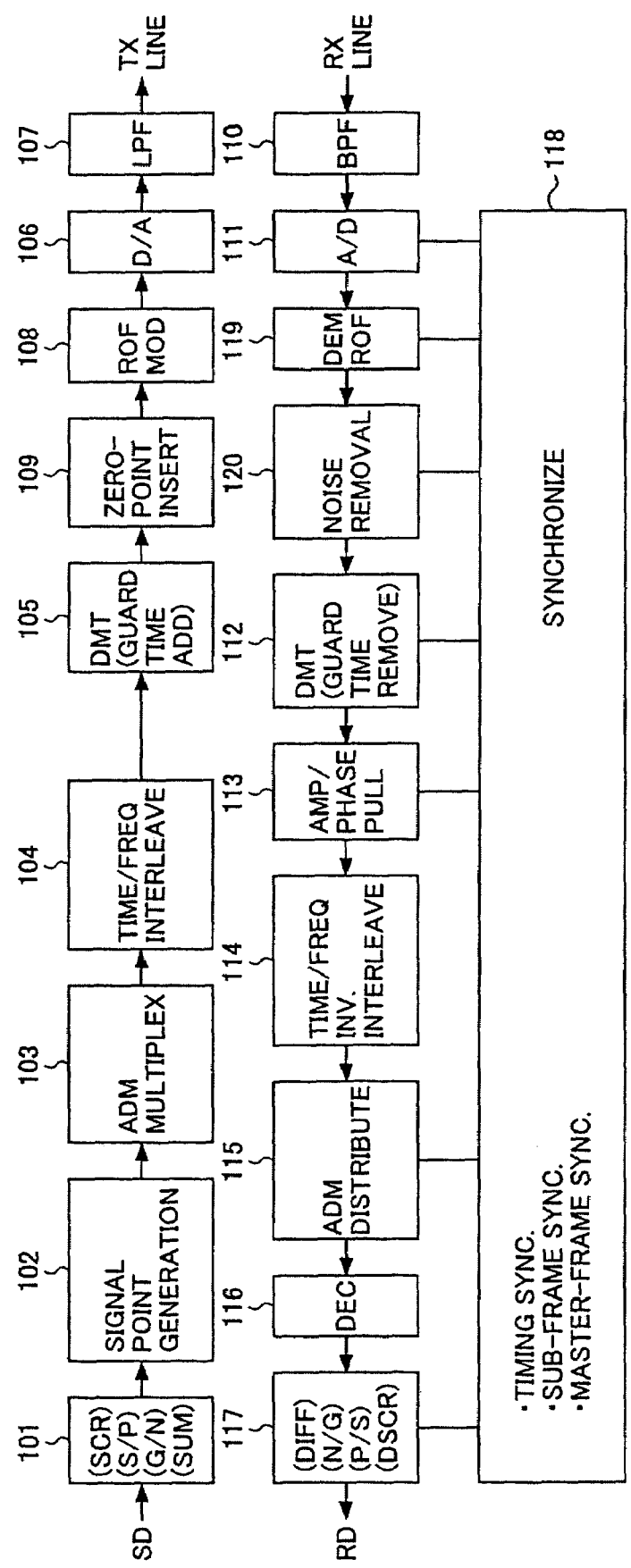
FIG. 4 illustrates another data transmission apparatus which includes a noise removal unit proposed by the applicant in the past.
Figure 6:
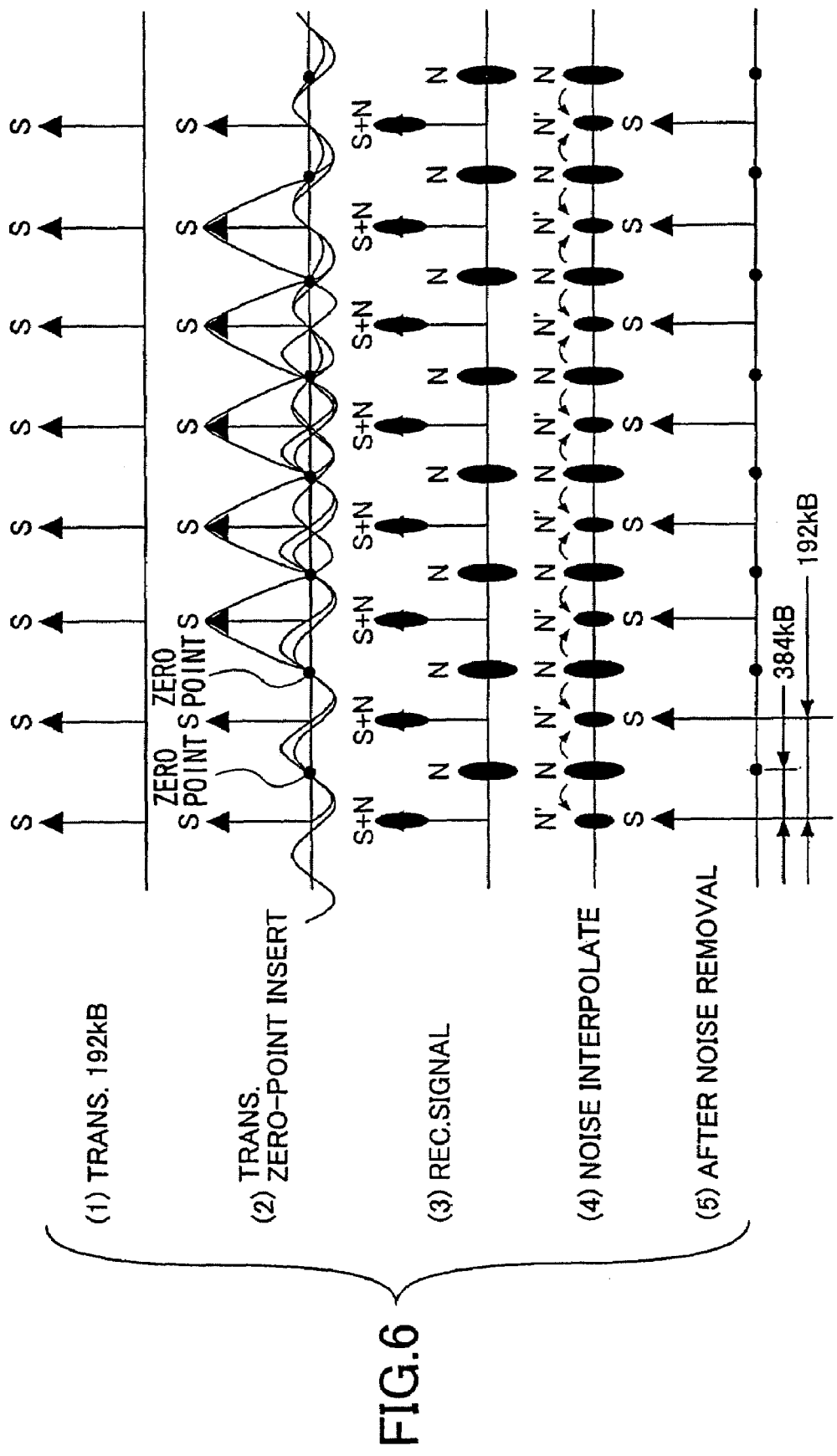
FIG. 6 illustrates noise removal operation.
Figure 9:
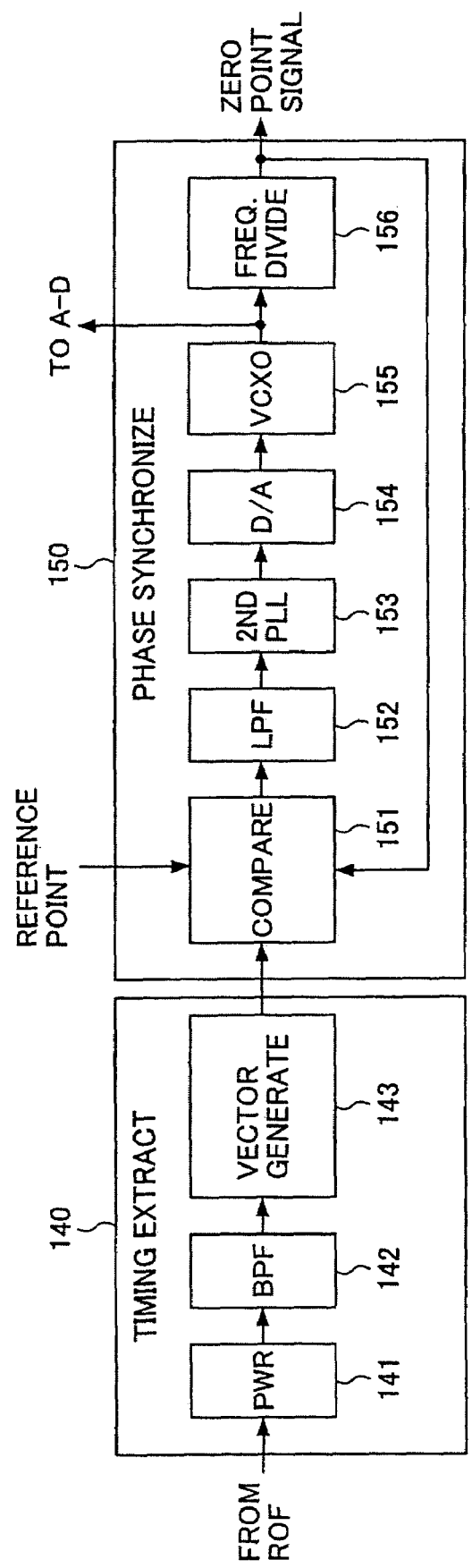
FIG. 9 illustrates a timing generation unit.
Figure 10:
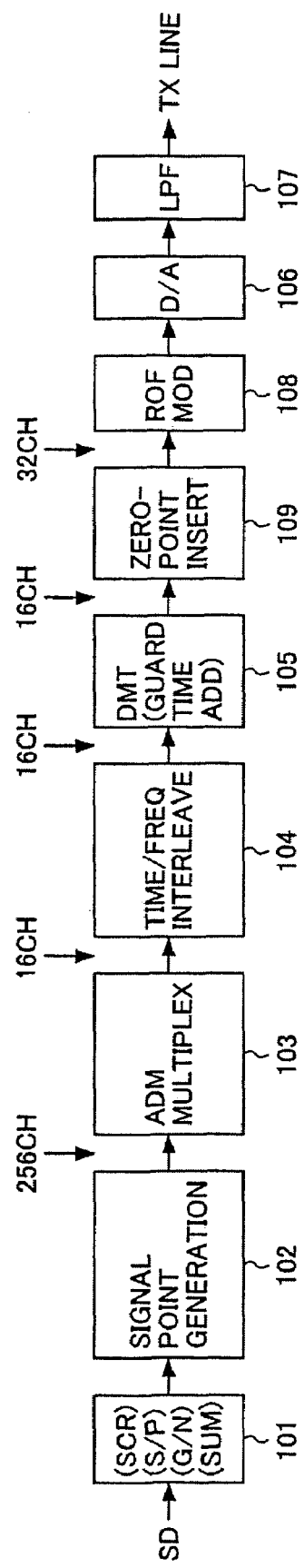
FIG. 10 illustrates transition of the number of channels in a configuration of a transmission part of the data transmission apparatus shown in FIG. 4.
Figure 11:
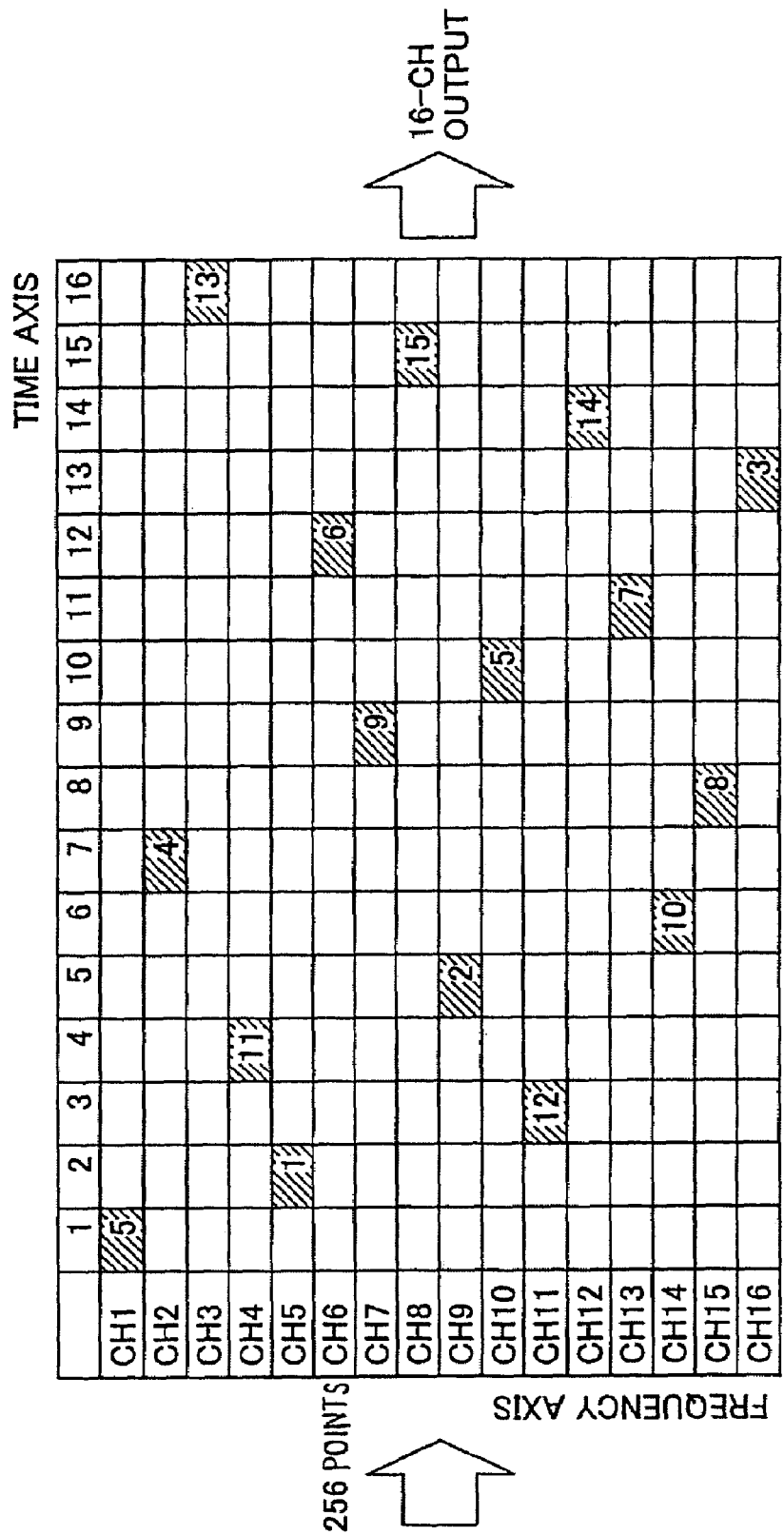
FIG. 11 illustrates two-dimensional interleaving operation.

FIGS. 17A through 17D illustrates zero point insertion and noise removal. Assuming that the transmission rate is 192 kB for signal points S, as shown in FIG. 17A, zero points are inserted between the signal points S equivalently as each set of data is copied once, as shown in FIG. 17B. Thereby, the transmission rate becomes twice, i.e., 384 kB. That is, similar to the case, for the signal points of (1) of FIG. 6 at the transmission rate of 192 kB, a single zero point is inserted between each adjacent signal points S as shown in (2) of FIG. 6, it is possible to equivalently insert the zero points along the time axis by performing data copy along the frequency axis. Therefore, as shown in FIG. 17C, the reception signal is such that noises are added to the signal points and zero points, respectively, similar to the case of (3) of FIG. 6. Then, the noises added to the signal points can be removed by extracting the noises added to the zero points. Thereby, the reception signal can be restored as shown in FIG. 17D. That is, the function of the zero point insertion unit 109 shown in FIG. 4 can be substantially achieved by the function of the above-mentioned data copy.

The zero point insertion is such that one or a plurality of zero points can be inserted between a plurality of signal points. For example, as shown in FIG. 18A, in a case where 16 sets of data at the head are copied, and thereby, one zero point is inserted between three signal points and subsequent three signal points. In this case, assuming that the band of the original data before the zero point insertion is 288 kHz, the data band of 384 kHz is obtained by the zero point insertion. FIG. 18B shows the state shown in the above-mentioned FIGS. 15A and 15B. FIG. 18C shows a case where two zero points are inserted between each adjacent signal points and the original data has the band of 128 kHz. Also in this case, the data band of 384 kHz is obtained by the two zero point insertion each time. Similarly, FIG. 18D shows a case where three zero points are inserted between each adjacent signal points and the original data has the band of 96 kHz. Also in this case, the data band of 384 kHz is obtained by the three zero point insertion each time.

Figure 19A:
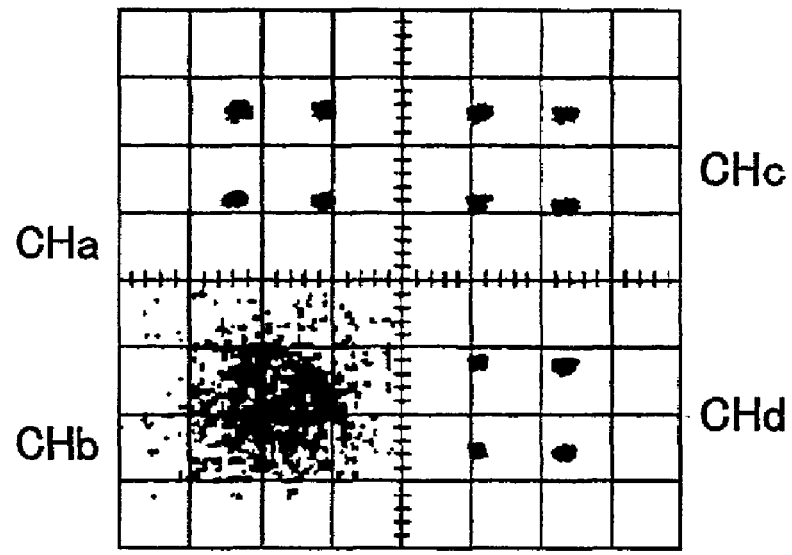
FIGS. 19A and 19B show eye-pattern measurement results illustrating a function of the present invention.
Figure 19B:
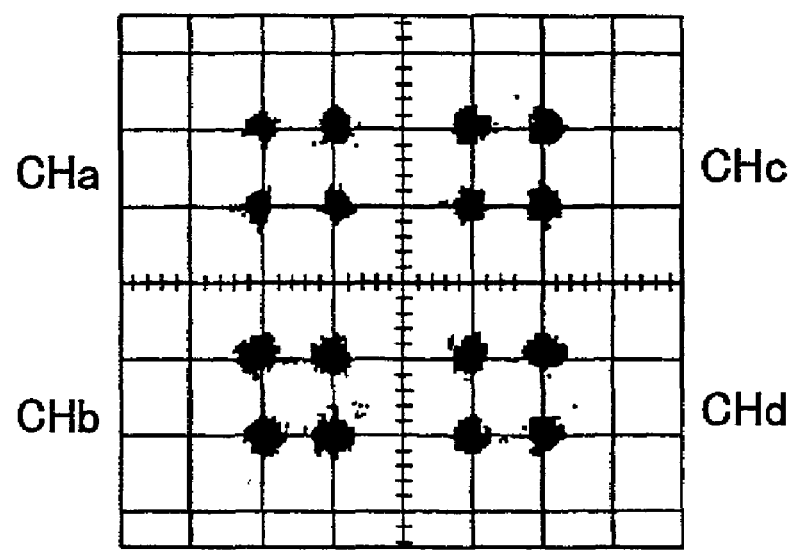

FIGS. 19A and 19B show eye-pattern measurement results in cases where two-dimensional interleaving is performed and the same is not performed. FIG. 19A shows modulation points of four-value QAM for four channels CHa, CHb, CHc and CHd in the case where two-dimensional interleaving is not performed. In this case, although the modulation points are clear for the channels CHa, CHc, and CHd, the modulation points for the channel CHb are not clear as being dispersed widely. That is, it is seen that S/N of the specific channel CHb is remarkably degraded. Accordingly, in this case, for the cannel CHb, data decision is not possible, and, thus, this channel cannot be used at all. Thereby, it is not possible to perform data transmission properly in total.

On the other hand, when the above-mentioned two-dimensional interleaving is performed, noise components are averaged thereby, and, thus, as shown in FIG. 19B, although the modulation points for the respective channels CHa, CHb, CHc and CHd are somewhat dispersed, it is seen that this state is such that proper data decision can be performed therefrom as the modulation points are almost clear. Thereby, stable data transmission can be made.

Figure 20:
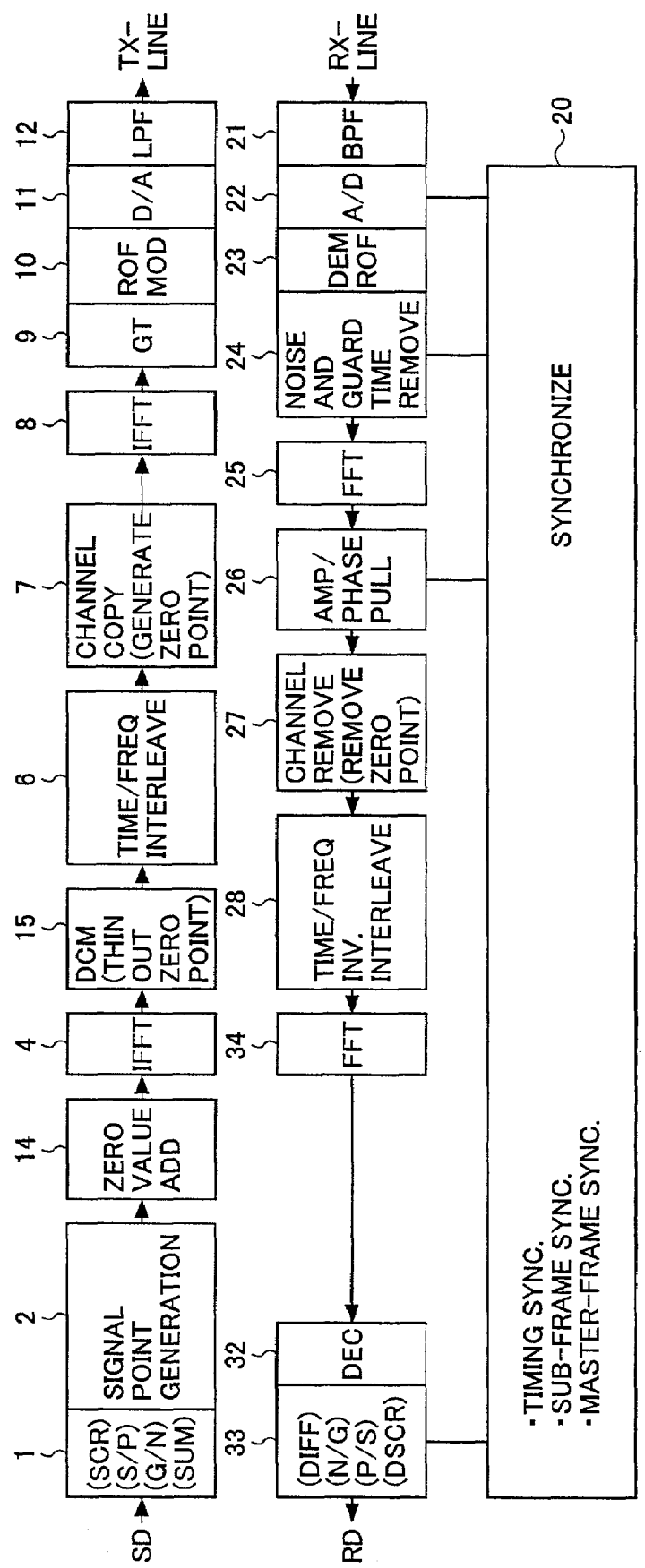
FIG. 20 shows a block diagram of a data transmission apparatus in a second embodiment of the present invention.

FIG. 20 illustrates a data transmission apparatus in a second embodiment of the present invention. The same reference numerals are given to the same units as those shown in FIG. 12. A zero value addition unit 14, a DCM unit 15, a second fast Fourier transform unit (FFT) 34 are provided in this apparatus. Instead of the channel copy unit 3 shown in FIG. 12 performing data copy so as to equivalently perform zero point insertion, actually zero points are inserted along the time axis by the zero value adding unit 14 in the second embodiment. The DCM unit 15 removes the zero points thus inserted, through thinning-out operation.

The functions and operations of the first and second fast inverse Fourier transform units 4 and 8, and the time-and-frequency interleaving unit 6 are the same as those in the case shown in FIG. 12. With regard to the reception part, not 64 channels but 16 channels or 32 channels are input to and output from the second fast Fourier transform unit 34 in the second embodiment. Thereby, the zero value insertion unit 29 and channel removal unit 31 shown in FIG. 12 are omitted. The other functions and operations are the same as those of the case shown in FIG. 12, and duplicate description is omitted.

Figure 21:
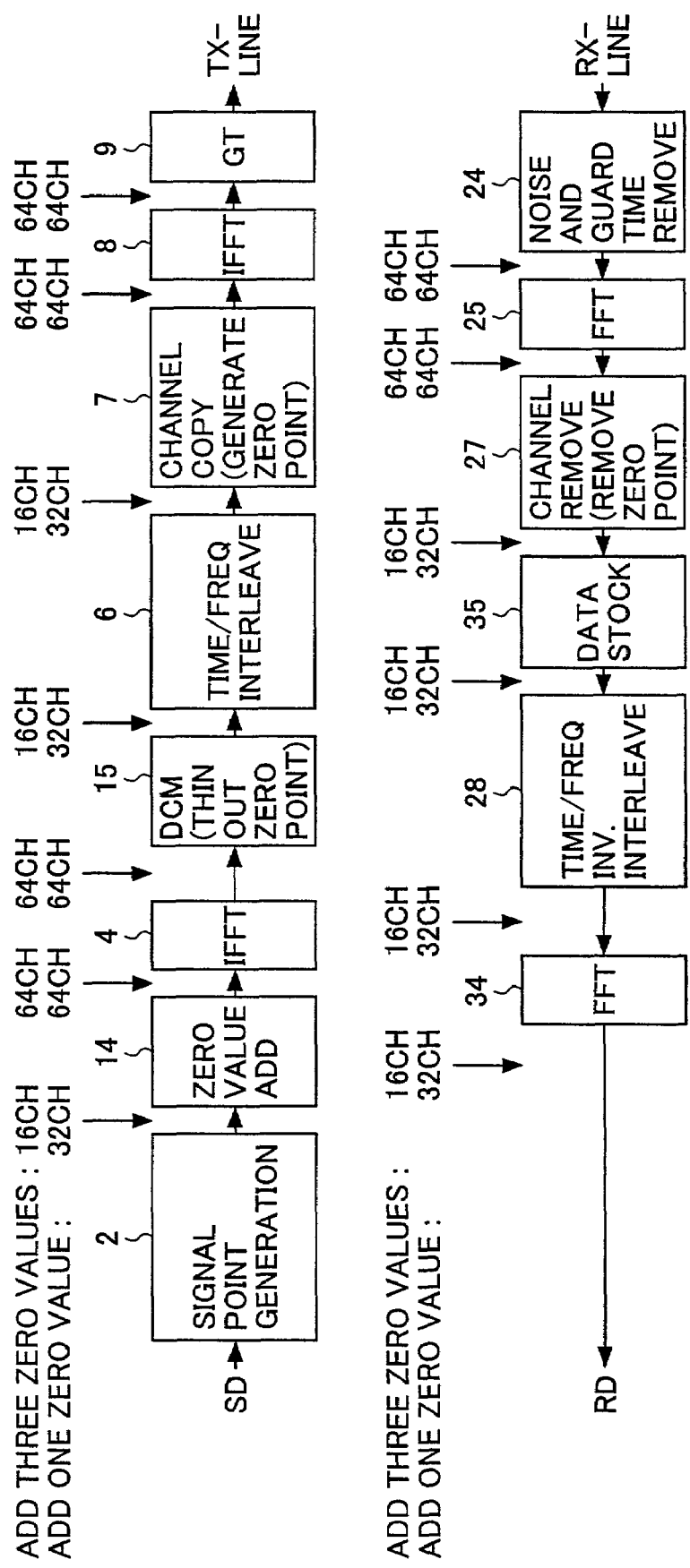
FIG. 21 shows transition of the number of channels in the configuration shown in FIG. 20.

FIG. 21 illustrates transition of the number of channels in the second embodiment. Adding a single zero value each time corresponds to copying once (take a single copy) each time in FIG. 13, and, similarly, adding add three zero values corresponds to copying thrice (take three copies) shown in FIG. 13. That is, in order to provide 64 channels to the first fast inverse Fourier transform unit 4, zero values are added by the zero value addition unit 14. Then, from 64 channels of the transform output of the fast inverse Fourier transform unit 4, the number of zero values thus added are thinned out by the DCM unit 15, and, the thus-obtained data is input to the time-and-frequency interleaving unit 6. Then, the data is copied by the channel copy unit 7 so that 64 channels may be inputted to the second fast inverse Fourier transform unit 8.

In the reception part, 32 channels or 16 channels of data which has undergone inverse interleaving processing by the time-and-frequency inverse interleaving unit 28 is input to the fast Fourier transform unit 34 as it is. The second fast Fourier transform unit 34 in the second embodiment is different from the second fast Fourier transform unit 30 shown in FIGS. 12 and 13 in that the number of channels input thereto is not fixed to 64 but may be different due to the number of zero values added at the transmission end. However, as the number of channels is small, no serious problem may occur.

FIG. 22 shows modulation forms and problems in transmission path. As the modulation forms/types, i.e., QAM, DMT, OFDM, SS (spread spectrum), and the present invention are shown there. For each modulation form/type, seriousness of problems concerning link equation, multipath, unnecessary band removal, and noise fluctuation is shown by a black triangle (indicating that some problem may occur) or a white circle (indicating that no problem may occur). With regard to link equation, it can be easily performed by employing a multi-carrier form/type such as DMT or OFDM. With regard to multipath, the problem can be solved by employing DMT, OFDM, or SS in which a guard time is added.

With regard to unnecessary band removal, although removal by using an external filter is possible, a method of utilizing an other-than-band removal unit using a wave shaping filter as in QAM is preferable in consideration of ensuring predetermined characteristics against a data transmission path. With regard to noise fluctuation, integration along the frequency axis of noise as in QAM, or integration along the time axis and along frequency axis as in SS is effective.

Therefore, according to the present invention, as link equation performed by the DMT or the like, addition of a guard time performed by the DMT or the like, the wave shaping filter technology in QAM, and the integration along the time axis and along the frequency axis performed by the two-dimensional interleaving are employed, stable data transmission can be achieved.

Figure 5:
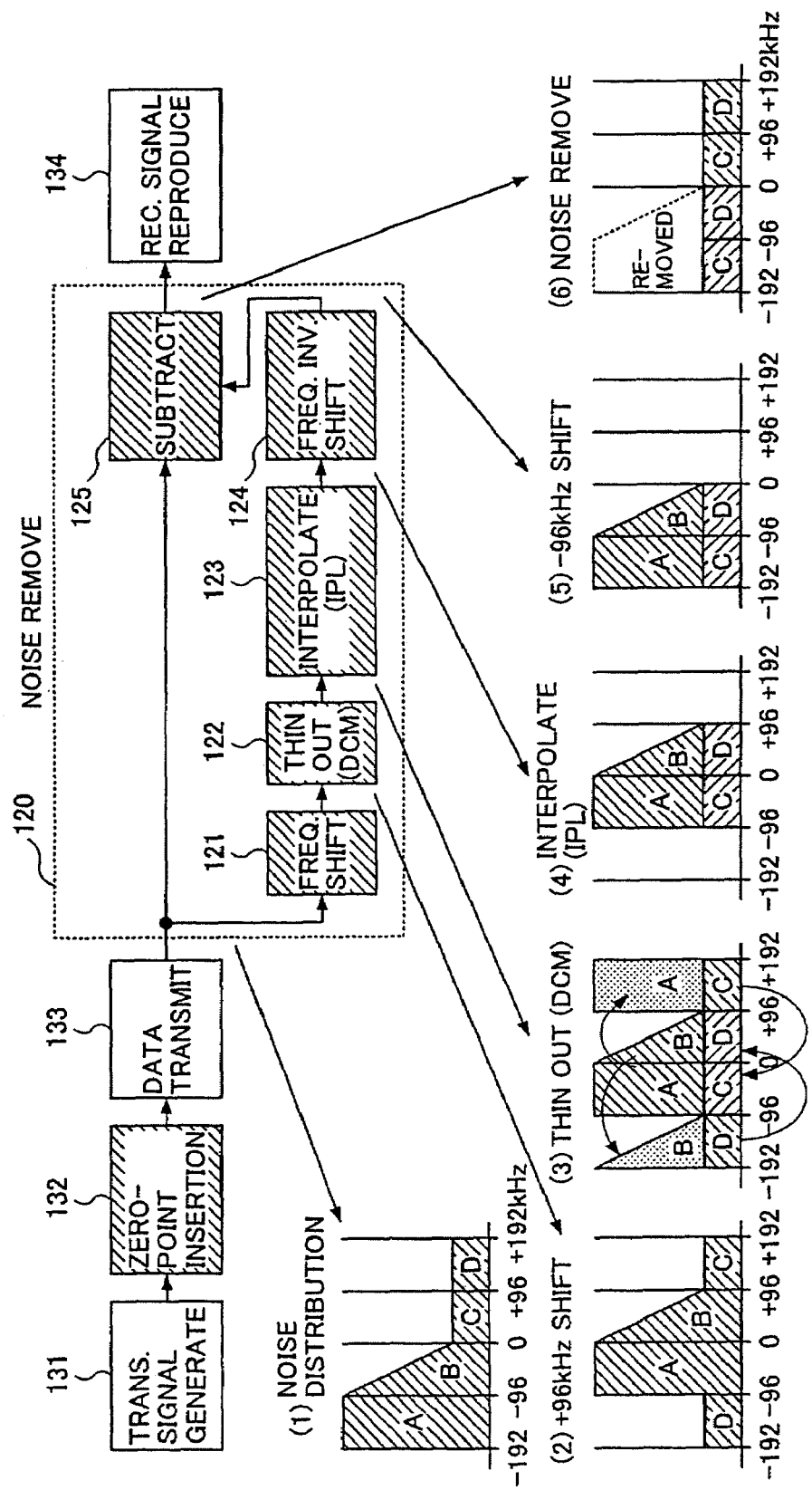
FIG. 5 illustrates the noise removal unit.

Embodiments of the present invention are not limited to the above-described ones, and, it is possible to employ configurations and/or methods of respective units of the above-described data transmission apparatuses which the applicant proposed in the past. For example, noise removal scheme described above with reference FIGS. 5 and 6 may be employed in an embodiment of the present invention by utilizing zero points generated along the time axis equivalently through channel copy, i.e., data copy. That is, the noise components at the zero point positions can be extracted by the noise and the guard time removal unit 24, and the noise of the signal point positions can be removed thereby. Further, although the number of input/output channels for the first and second fast inverse Fourier transform units 4 and 8 and the first and second fast Fourier transform units 25 and 30 is 64 in the first embodiment, another number of channels may be employed instead of 64 therefor. Further, it is also possible to replace the reception part shown in FIG. 12 by the configuration shown in FIG. 20. That is, the number of channels required for the second fast Fourier transform unit 34 is made smaller than the number of channels required for the first fast Fourier transform unit 25.

Further, the present invention is not limited to the above-described embodiments, and variations and modifications may be made without departing from the scope of the present invention.

The present application is based on Japanese priority application No. 2001-186274, filed on Jun. 20, 2001, the entire contents of which are hereby incorporated by reference.

What is claimed is:

1. A data transmission method, comprising the steps of:
   a) performing two-dimensional interleaving along a time axis and along a frequency axis;
   b) transmitting thus-obtained data by a multi-carrier transmission form; and
   c) producing, by channel copy operation, data which is short with respect to the required number of channels for fast inverse Fourier transform performed antecedent to and subsequent to said step a).

2. The method as claimed in claim 1, further comprising the steps of:
   d) generating zero points along the time axis equivalently by channel copy operation so as to provide the number of channels required for the fast inverse Fourier transform performed antecedent to said step a); and
   e) removing the zero points from the result of the fast inverse Fourier transform before said step a).

3. The method as claim 2, further comprising the step of:
   f) performing channel copy operation on the result of said step a) so as to provide the number of channels required for the fast inverse Fourier transform performed subsequent to said step a).

4. The method as claimed in claim 1, wherein the number of channels required for the fast inverse Fourier transform performed antecedent to said step a) and the number of channels required for the same but performed subsequent to said step a) are made equal.

5. The method as claimed in claim 1, further comprising the step of:
   d) extracting noise at the zero points equivalently inserted along the time axis by the channel copy operation; and
   e) removing noise at signal points of a reception signal by using the result of said step d).

6. A data transmission apparatus, comprising:
   a part performing two-dimensional interleaving along a time axis and along a frequency axis;
   a part transmitting thus-obtained data by a multi-carrier transmission form; and
   a part producing, by channel copy operation, data which is short with respect to the required number of channels for fast inverse Fourier transform performed antecedent and subsequent to the process performed by said part performing two-dimensional interleaving.

7. The apparatus as claimed in claim 6, further comprising:
   a part performing the fast inverse Fourier transform antecedent to the process performed by said part performing two-dimensional interleaving; and
   a part performing the fast inverse Fourier transform subsequent to the process performed by said part performing two-dimensional interleaving,
   wherein said part producing the short data by channel copy operation comprises:
   a part producing data which is short with respect to the required number of channels for said part performing the fast inverse Fourier transform performed antecedent to the process performed by said part of performing two-dimensional interleaving; and
   a part producing data which is short with respect to the required number of channels for said part performing the fast inverse Fourier transform performed subsequent to the process performed by said part performing two-dimensional interleaving.

8. The apparatus as claimed in claim 6, wherein the number of channels required for the fast inverse Fourier transform performed antecedent to said process of two-dimensional interleaving and the number of channels required for the same but performed subsequent to said process of two-dimensional interleaving are made equal.

9. The apparatus as claimed in claim 6, wherein the number of channels required for fast Fourier transform performed antecedent to a process of performing two-dimensional inverse interleaving performed at a reception end corresponding to the process of the two-dimensional interleaving and the number of channels required for the same but performed subsequent to said process of the two-dimensional inverse interleaving are made equal.

* * * * *